(12) United States Patent
Arnold et al.

(10) Patent No.: US 10,078,013 B2
(45) Date of Patent: Sep. 18, 2018

(54) SYSTEMS AND METHODS USING MULTI-WAVELENGTH SINGLE-PULSE RAMAN SPECTROSCOPY

(71) Applicant: UNIVERSITY OF MARYLAND BALTIMORE COUNTY, Baltimore, MD (US)

(72) Inventors: Bradley Arnold, Columbia, MD (US); Christopher Cooper, Columbia, MD (US); John Cataldi, Columbia, MD (US)

(73) Assignee: University of Maryland Baltimore County, Baltimore, MD (US)

( * ) Notice: Subject to any disclaimer, the term of this patent is extended or adjusted under 35 U.S.C. 154(b) by 0 days.

(21) Appl. No.: 15/723,103

(22) Filed: Oct. 2, 2017

(65) Prior Publication Data

US 2018/0136043 A1 May 17, 2018

Related U.S. Application Data

(60) Provisional application No. 62/402,385, filed on Sep. 30, 2016, provisional application No. 62/515,682, filed on Jun. 6, 2017.

(51) Int. Cl.
*G01J 3/28* (2006.01)
*G01J 3/44* (2006.01)
*G01J 3/18* (2006.01)
*G02B 6/32* (2006.01)
*G01J 3/06* (2006.01)
*G02B 5/18* (2006.01)

(52) U.S. Cl.
CPC . *G01J 3/44* (2013.01); *G01J 3/06* (2013.01); *G01J 3/18* (2013.01); *G01J 3/2803* (2013.01); *G02B 5/1814* (2013.01); *G02B 6/32* (2013.01)

(58) Field of Classification Search
CPC ........ G01J 3/02; G01J 3/06; G01J 3/44; G01J 3/18; G01J 3/28; G02B 6/32; G02B 5/18; G01N 21/65; G01N 21/64
See application file for complete search history.

(56) References Cited

U.S. PATENT DOCUMENTS 5,751,416 A * 5/1998 Singh .................. G01J 3/30
356/300

* cited by examiner

*Primary Examiner* — Abdullahi Nur
(74) *Attorney, Agent, or Firm* — Juneau & Mitchell; Todd L. Juneau

(57) ABSTRACT

The invention provides methods and apparatus comprising a multi-wavelength laser source that uses a single unfocused pulse of a low intensity but high power laser over a large sample area to collect Raman scattered collimated light, which is then Rayleigh filtered and focused using a singlet lens into a stacked fiber bundle connected to a customized spectrograph, which separates the individual spectra from the scattered wavelengths using a hybrid diffraction grating for collection onto spectra-specific sections of an array photodetector to measure spectral intensity and thereby identify one or more compounds in the sample.

17 Claims, 34 Drawing Sheets

FIGURE 15 - VEHICLE

FIGURE 16 - CHECKPOINT

FIGURE 17 - WATER TREATMENT 1710
detection of target
compounds in water
treatment or waste
treatment facility

FIGURE 18 – SHIPPING/TRANSPORT

SYSTEMS AND METHODS USING MULTI-WAVELENGTH SINGLE-PULSE RAMAN SPECTROSCOPY

CROSS-REFERENCE TO RELATED APPLICATIONS

Provided per USPTO rules by Application Data Sheet.

STATEMENT REGARDING FEDERALLY SPONSORED R&D

Provided per USPTO rules by Application Data Sheet.

NAMES OF PARTIES TO JOINT RESEARCH AGREEMENT

Provided per USPTO rules by Application Data Sheet.

REFERENCE TO SEQUENCE LISTING

Provided per USPTO rules by Application Data Sheet.

STATEMENT RE PRIOR DISCLOSURES

Provided per USPTO rules by Application Data Sheet.

BACKGROUND OF THE INVENTION

Field of the Invention

The invention relates to a multi-wavelength single-pulse stand-off Raman spectroscopy system using unfocused laser excitation wavelengths provided as a viable solution for long-distance detection of trace materials.

Prior Art

Since the discovery of the Raman effect in 1928 by C. V. Raman and K. S. Krishnan, Raman spectroscopy has become an established as well as a practical method of chemical analysis and characterization applicable to many different chemical species. The Raman effect, or Raman scattering, is well known. Briefly and simply, when a beam of light impinges on substances, light is scattered. This scattering is of several different types, the predominant type being Rayleigh scattering, wherein the wavelength of the scattered light is the same as that of the incident light. In the type utilized in the present invention, Raman scattering, the scattered light is of different wavelengths than the incident light; photons interact with the substance and are re-emitted at higher and lower wavelengths. A Raman spectrum of a substance is constituted of Raman scattered light and is spread across a wavelength band even if the incident light is monochromatic, that is, the incident light is of a single wavelength. There is a unique Raman spectrum of a particular substance for, or associated with, each incident wavelength. In practice, a monochromatic beam of incident light is typically used in Raman spectroscopy because of the difficulties in obtaining spectral separation. When Raman and Rayleigh scattered light is resolved into a spectrum by a spectrograph, Raman lines will appear on both sides of the Rayleigh line. The Raman line or lines on the low frequency side (or low wavenumber side or high wavelength side) of the Rayleigh line are more intense than those on the high frequency side and are called the Stokes line or lines; those on the high frequency side are called the anti-Stokes line or lines. Not all substances are Raman active; there must be a change in polarizability during a specific molecular vibration in order that a substance be Raman active. Substances which do exhibit Raman spectra can be characterized by means of their spectra. Qualitative analysis of a substance can be accomplished by comparison of the locations of its Raman lines with those of known standards. Quantitative analysis can be accomplished by comparison of intensities of Raman lines; this is generally a linear relationship. Of course, spectra which are compared must result from exciting radiation of the same wavelength. For purposes of this document, a substance is defined as any composition of matter, including a pure compound, and mixtures or solutions of chemical compounds.

SUMMARY

Accordingly, to address the limitations of the prior art and provide a solution to needs in the field of Raman spectrography and for identification of unknown samples at long range, the invention provides a multi-wavelength laser source that uses a single unfocused pulse of a low intensity but high power laser over a large sample area to collect Raman scattered collimated light, which is then Rayleigh filtered and focused using a singlet lens into a stacked fiber bundle connected to a customized spectrograph, which separates the individual spectra from the scattered wavelengths using a hybrid diffraction grating for collection onto spectra-specific sections of an array photodetector.

Unlike prior Raman spectroscopy systems, which requires alignment between the incident beam with the collection optics both focused on the same position in space, the present invention does not use a focused beams and thereby does not have the alignment issues of the prior art. Further, since the present invention does not require a beam that is focused on a single point, but rather uses a multi-wavelength unfocused beam, scattered light from a much larger sample area can be collected. This ability enables large sample areas to be scanned rapidly.

Additionally, because there are no focal plane requirements with either the incident or scattered light, and since the incident beam can be a single pulse, the target surface can be in motion (x-y-z axes) relative to the laser output and to the collection optics and still allow the system to record Raman spectra that are indicative of the targeted area.

Because the incident beam (i) is not focused onto the target area, in combination with (ii) the non-continuous single incident pulses can be used, low intensity, but high power, laser irradiation can be utilized to interrogate the sample. As a direct consequence, low penetration depth into the sample can be used yet allow large numbers of molecules to be interrogated. Raman scatter from samples that are strong absorbs of the incident and scattered wavelengths can still be observed with unprecedented efficiency.

Further, a low intensity incident beam that would typically be focused onto the sample can lead to sample degradation or destruction, resulting in high background noise and signals due to decomposition products, the resulting spectral measurements are unusable. Because there is no requirement to focus the incident beam in the current technology coupled with the ability to record spectra in a single incedent laser pulse, sample damage is minimized and accurate Raman spectra that are free from photochemical artifacts can be obtained.

In one non-limiting preferred embodiment, the apparatus for Raman spectra measurement, comprises: (i) a Nd YAG laser configured to simultaneously output a single pulse of an unfocused beam of photons in two or more excitation wavelengths selected from 213, 266, 532 and 1064 nm onto a sample, said laser output ranging from 1-100 mJ per pulse at 10 Hz; (ii) a dichroic Rayleigh filter stack in optical communication with scattered light from the single pulse of unfocused beam of photons incident on the sample; (iii) a singlet lens in optical communication with the dichroic Rayleigh filter stack to focus the scattered light from the sample and couple the scattered light into a proximal end of a stacked fiberoptic bundle; (iv) a spectrograph equipped with a hybrid diffraction grating attached to a distal end of the stacked fiberoptic bundle, said hybrid diffraction grating comprised of a stack of at least two diffraction surfaces, each diffraction surface configured for blaze density and wavelength for one of the two or more excitation wavelengths, each diffraction surface individually angle-tuned and target-adjusted to disperse the scattered light, wherein the spectrograph is configured to to illuminate all of the at least two diffraction surfaces simultaneously; (v) an array detector system in optical communication with the spectrograph and configured to receive the dispersed scattered light from each diffraction surface onto a specific target section of an array detector, and output a spectral intensity measurement.

In another preferred embodiment, there is also provided an apparatus, wherein the hybrid diffraction grating is a surface relief reflection grating wherein depth of a surface relief pattern on the grating modulates the phase of the scattered light.

In another preferred embodiment, there is also provided an apparatus wherein the hybrid diffraction grating is a volume phase grating wherein the scattered light phase is modulated as it passes through a volume of a periodic phase structure.

In another preferred embodiment, there is also provided an apparatus wherein the hybrid diffraction grating comprised of a stack of four diffraction surfaces.

In another preferred embodiment, there is also provided an apparatus wherein the hybrid diffraction grating comprised of a stack of eight diffraction surfaces.

In another preferred embodiment, there is also provided an apparatus wherein the laser output is 3-9 mJ per pulse at 10 Hz.

In another preferred embodiment, there is also provided an apparatus wherein the array detector is selected from a charge-coupled device (CCD), an intensified charge-coupled device (ICCD), an InGaAs photodetector, and a CMOS photodetector.

In another preferred embodiment, there is also provided an apparatus wherein the array detector system comprises two or more arrays selected from the group consisting of a CCD, an ICCD, an InGaAs photodetector, and a CMOS photodetector.

In another preferred embodiment, there is also provided an apparatus wherein the apparatus is mounted on a vehicle, an unmanned vehicle, a piloted aircraft, a drone aircraft, or a satellite.

In another preferred embodiment, there is also provided an apparatus wherein the dichroic Rayleigh filter stack and the singlet lens are mounted within a remote probe housing.

In another preferred embodiment, there is also provided an apparatus wherein the laser, the dichroic Rayleigh filter stack, the singlet lens, the spectrograph, and the array detector system are mounted within a single housing.

In another preferred embodiment, there is also provided an apparatus wherein the housing is 8-16 cm in height, 50-90 cm in length, and 30-90 cm in width.

In another preferred embodiment, there is also provided a method for comparing the Raman spectral intensity measurement of an unknown sample against a library of spectral intensity measurements, comprising the steps: (i) providing an apparatus according to teachings and disclosure herein; (ii) subjecting the unknown sample to a single unfocused pulse from the Nd YAG laser, wherein said sample has a standoff distance from the laser ranging from 0.30 meters to 20,000 meters; (iii) obtaining a Raman spectral intensity measurement of the unknown sample; and (iv) comparing the Raman spectral intensity measurement of the sample against a library of spectral intensity measurements of known samples.

In another preferred embodiment, there is also provided a method wherein the standoff distance from the laser ranges from 0.30 meters to 200 meters.

In another preferred embodiment, there is also provided a method wherein the sample is selected from the group consisting of a particle, a powder, a flake, a solid, a liquid, a gas, a plasma, a gel, a foam, and combinations thereof.

In another preferred embodiment, there is also provided a method further comprising the step of identifying a match for the spectral intensity measurement of the unknown sample from the spectral intensity measurement of the known samples.

In another preferred embodiment, there is also provided a method further comprising the step wherein the identified match is used in a system selected from the group consisting of: real-time detection of a roadbed explosive; assessment of diamond quality; real-time identification of chemical species within a plasma reactor environment; real-time identification of drilling fluids; real-time identification of hydrocarbon oil mixtures; real-time identification of constituents of a process stream at an inlet of a reaction vessel; real-time characterization of fuel at a fuel dispenser; real-time monitoring of reacting chemicals in semi-conductor manufacturing; real-time monitoring of reacting chemicals in pharmaceutical manufacturing; identification of a horticultural chemical; identification of a biochemical compound; identification of a polymer; authentication of a product; identification of a pathogen; identification of a toxin; real-time detection of a target compound on baggage in an airport; real-time detection of a target compound on shipping containers and boxes; real-time detection of a target compound in a water treatment facility; real-time detection of a target compound in smokestack emissions; real-time detection of a target compound in waste water; real-time detection of a target compound in a hazardous spill; real-time detection of a target compound on a law enforcement forensic sample.

BRIEF DESCRIPTION OF THE DRAWINGS

FIG. 1 shows how the unfocused fundamental and harmonic output of a Nd YAG laser system is allowed to strike the sample and scatter from the molecular components, where the naturally collimated scatter is filtered to remove Rayleigh scatter and coupled into a fiber optic using a single lens, where the fiber is connected to a spectrograph equipped with the hybrid grating allowing individual spectra from different scattered wavelengths to be simultaneously collected on an ICCD detector system.

FIG. 5 shows a top box contains the UV information while the bottom box contains the visible information. Note the bright spots which are the spectral images of the individual fibers.

DETAILED DESCRIPTION OF THE INVENTION

Figure 1:
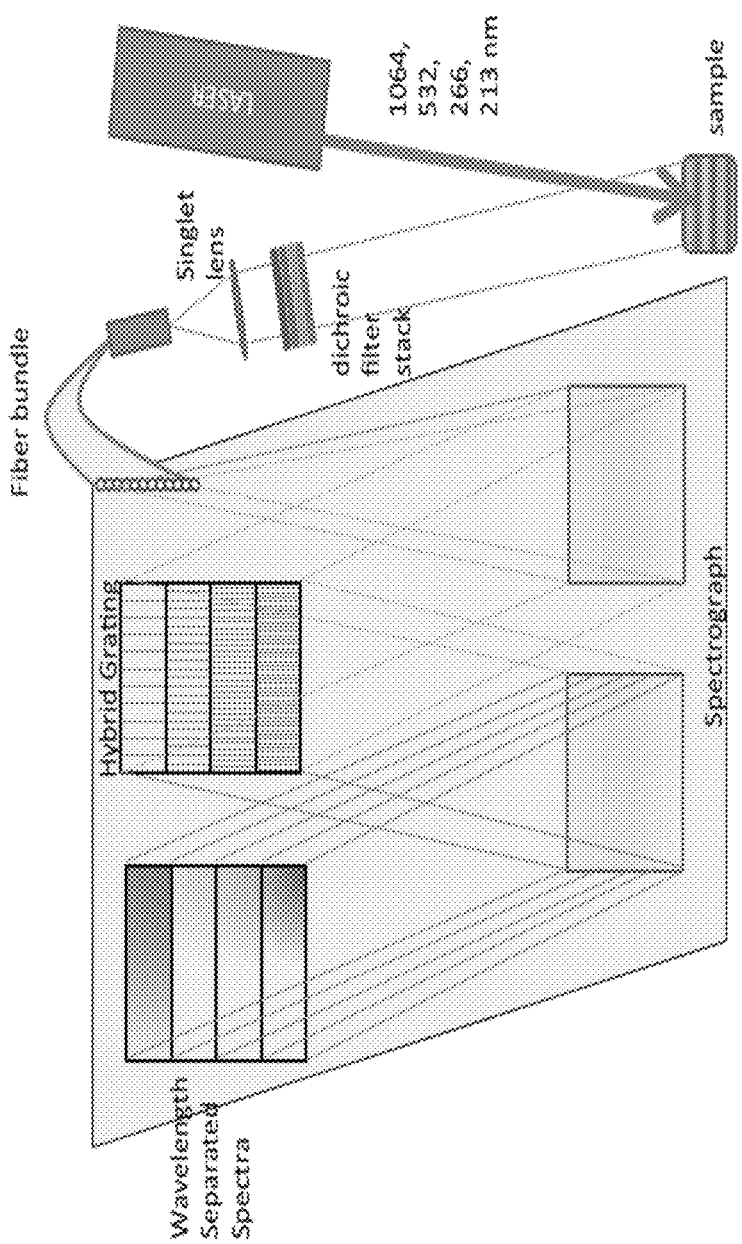
FIG. 1 is an illustration and shows a non-limiting example of an apparatus showing multi-wavelength Raman spectrograph based on hybrid stacked diffraction grating.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

Raman spectroscopy is a leading analytical technique for rapid and selective detection. Past sensitivity issues have been largely overcome due to the availability of efficient fiber-optic coupled spectrographic systems equipped with sensitive Intensified Charge-Coupled Device (ICCD) detection arrays and utilizing high intensity laser sources. In Raman spectroscopy a balance is made between the selection of the wavelength to be used as the scattering source and the resolution used to collect the resulting spectra. Scattering using ultraviolet wavelengths experience higher interaction cross-sections but suffer from absorption effects, luminescence from both analyte and background materials as well as photochemical degradation of the sample. Scattering using longer wavelengths is fundamentally weaker but may avoid absorption effects although background emission can still be a problem. High resolution spectra can be used to discriminate between closely related materials through analysis of fundamental frequencies but complete Raman spectra is difficult to obtain at the high-resolution limit.

Difficulties arising from trying to balance which regions of the spectrum to collect versus the information sought are mitigated by the development of the unique multi-wavelength Raman spectrographic system disclosed and claimed herein. The novel detection scheme described herein removes the necessity of making the choice of excitation wavelength and resolution a priori by collecting the Raman spectrum at multiple excitation wavelengths and/or resolutions simultaneously.

The use of high peak power laser systems capable of delivering intense light pulses provides the use Raman spectroscopy as a selective analytical technique for stand-off detection. Commercially available Nd:YAG laser sources are used to produce high fluencies of 1064, 532, 355, 266 and 213-nm excitation pulses simultaneously. The selection of excitation pulse to be used is a decision based on the balance between the characteristics of the analyte of interest, sources of background interferences, and overcoming low Raman scattering cross-sections. Frequency dependence of Raman cross-sections is described using a frequency to the 4th power ($v^{4th}$) excitation dependence. Thus, cross-sections observed using the fifth harmonic of Nd:YAG at 213 nm will be 500 to 1000 times greater than the same transitions observed using the fundamental at 1064 nm based solely on this $Ni^4$ dependence. A more important benefit of ultraviolet (UV) sources arises when the incident wavelength approaches the energy needed for electronic excitation of the scattering molecule. Resonance enhancement factors of $10^2$-$10^6$, or more, can be observed. Such large resonance enhancements to the Raman cross-sections could make the sensitivity of UV-based Raman spectroscopy comparable to typical luminescence detection techniques and possibly allow single molecule detection to become available.

The present invention addresses loss of intensity in both the incident and scattered beams due to absorption by the sample, interference by fluorescence and photochemical degradation of the sample unique to deep-UV excitation.

The invention also addresses spectral resolution. In liquids and solids, the fundamental resolution of scattered frequency for vibrational transitions is on the order of 2-5 $cm^{-1}$. Raman spectra require a range of approximately 4000 $cm^{-1}$ to cover the entire spectrum and using the general rule that 10 data points are needed to accurately define peak shapes. Therefore, ~10000 pixels of data are needed to collect an entire Raman spectrum at the fundamental limit of high resolution which is why selected regions of interest must be collected and entire spectra are not available.

The invention relates to the development of a multi-wavelength Raman spectroscopy system that allows several excitation wavelengths to be used simultaneously. The inventive design allows many of the difficulties associated with high fluence excitation to be mitigated.

Large sample areas were imaged into the detection system allowing low intensity (high power) excitation sources to be used while avoiding sample degradation and multi-photon absorption effects. Such large detection areas permitted large numbers of molecular scatters to be probed with minimal penetration depth. Alignment issues were minimized and the need for focal plane adjustments was eliminated.

The inventive technology also allowed multiple spectra to be collected simultaneously with selected resolutions thus allowing the entire spectrum at modest resolution and specific regions of interest to be examined at high resolution in a single laser pulse. This ability eliminates the need to guess at which spectral region may be required.

This approach avoids the need to select excitation wavelength by collecting multiple Raman spectra using several available excitation wavelengths simultaneously.

Referring now to the FIGURES, one non-limiting preferred configuration is shown in FIG. 1. Specifically, the output wavelengths of a Nd:YAG, in which the fundamental at 1064 nm and the harmonics at 532, 355, 266 and 213-nm are generated, are all allowed to excite the sample simultaneously. The 3rd harmonic at 355 nm may also be available but for the purposes of this discussion was not considered. The scatter emanating from the sample at each of these wavelengths passes through dichroic filters to facilitate rejection of the intense Rayleigh scattered light. The remaining wavelengths are coupled into the end of a fiber optic bundle using a singlet lens. The distal end of the fiber is attached to a spectrograph equipped with a hybrid diffraction grating. The hybrid grating consists of a stack of diffraction surfaces, each designed to be optimized for blaze density and wavelength for one of the specific excitation wavelengths used. Each section of the hybrid grating stack is individually angle-tuned and adjusted to allow the scattered light, originating from each excitation wavelength, to be dispersed through the similar diffraction angles and onto different sections of the ICCD array. To accomplish this function, the collected light emerging from the fiber illuminates all four diffraction surfaces simultaneously. In turn, the diffracted light from each of the grating diffraction surfaces fall onto different sections of the ICCD detection device. As a result, unique Raman spectra are collected simultaneously at each of the excitation wavelengths.

Although Nd-YAG laser at 1064 nm is illustrated, any laser capable of producing a beam having multiple wavelengths is contemplated as within the scope of the invention. Non-limiting examples include Ytterbium (-YAG, -doped, or -glass), Titanium sapphire, Neodymium (-glass, -YCOB, -$YVO_4$, -YLF, or -CrYAG), Helium-Neon, and Argon lasers.

Although an ICCD is illustrated, any array photodetector or multiple arrays of photodetectors are contemplated as within the scope of the invention. Non-limiting examples include CCD, an InGaAs photodetector, a CMOS photodetector, FET photodetectors, and combinations thereof.

In another preferred non-limiting embodiment, there is provided a multi-wavelength Raman spectrographic system to collect two different wavelength regions simultaneously. This prototype system uses an available monochromator to which a diode array detector system is attached.

In another preferred non-limiting embodiment, there is provided a second system that utilizes a hybrid grating system fabricated using commercially available gratings. Gratings were purchased from Richardson Gratings as in-stock items. The gratings were selected to allow near optimal dispersion of the wavelengths used for this study at the wavelengths of interest. This non-limiting example is provided to illustrate the rapid availability of associated optical components, and therefore uses excitation wavelengths of 266 nm and 532 nm.

An existing spectrograph is modified extensively to accept the hybrid gratings in a computer controlled turret system. Fiber optic coupling of the input signals, as well as ICCD detection of the dispersed light from the hybrid grating system, is accomplished using a modified version of a commercial spectrograph (Acton SpectraPro 2300i spectrograph with a Roper 256×1024 PIMAX ICCD camera).

In other preferred embodiments, the detector array is a CCD 2048 px detector array, or is a 256 px InGaAs detector array.

The laser system used is a Quantel Brilliant B Nd:YAG laser set to output 3 mJ of 266 with 9 mJ of 532 nm light per pulse at 10 Hz. Depending on the application, the laser power may be 100 mW, or it may range from 50-450 mW for small scale nearby applications. However, Nd-YAG lasers can be configured to project long distances. For example, a 3 MW Nd-YAG (1064 nm) laser at 12 PPM (PRF) has a range up to 999 m, a 4 MW Nd-YAG (1064 nm) laser at 10 Hz (PRF) has a range up to 9995 m, and a 3 MW Nd-YAG (1064 nm) laser at 5 Hz (PRF) has a range up to 19,995 m. Accordingly, sample detection also contemplates the long range use of a Nd-YAG (1064 nm) laser and Raman analysis would only be limited by the detection system.

The detection system herein also contemplates the use of enhanced receiving optics that may include a detector filter, a pre-amplifier, an amplifier, as well as Fast A/D digital signal processing chips and electronics for amplifying optical signals, such as signal averaging (10×) of received waveforms to improve SNR. In some embodiments, multiple pulses may be necessary at very long ranges to take advantage of the averaging that can take place from the high pulse repetition frequencies (PRFs) possible with some Nd-YAG lasers.

A suitable fiber optic bundle may be purchased from Acton and adapted for use in this system. As shown in this non-limiting example, the fiber bundle has 19 fibers, and may be arranged as a vertical stack to facilitate vertical alignment from fiber to detector array.

The spectrograph and detector is controlled using Winspec 32 software. ICCD output is to a display, a recording device, etc. Additional library software for identification and comparison to spectra measurements may be purchased from existing Raman library vendors, or customized libraries can be loaded into memory of the apparatus.

The term "stand off" means the ability to project a laser impulse or beam onto a distant sample. The distance contemplated herein ranges from 0.30 meters-20,000 meters (20 Km). Nd-YAG lasers are used in laser range finding and are only limited by atmospheric attenuation or line of sight problems. For specific use applications, the apparatus and laser can be configured for distances ranging from 0.30 to 1.0 meter, from 0.30 to 30 meters, from 0.30 to 300 meters, from 30 to 1000 meters, from 100 to 300 meters, from 1000 to 5000 meters, from 1000 to 20,000 meters, as well as ranges falling there-between.

In other preferred embodiments, the apparatus may be a portable device with an integrated touch screen. Alternatively, the apparatus may be a stand-alone unit with attached peripherals. It is contemplated as within the scope of the invention that the apparatus or device may have external data ports to a computer, including USB 2.0, USB 3.0, USB-C, lightning connector, WiFi connection, Bluetooth, and Ethernet port(s).

Where the unit is portable, it is contemplated that the apparatus fits into a portable-sized housing, such as 305 mm×380 mm×168 mm, in order to fit on a 19 inch rack. In another example, the unit may be 8-16 cm in height, 50-90 cm in length, and 30-90 cm in width. In another non-limiting example, the unit may be a handheld device having a housing size 2-5 cm in height, 10-40 cm in length, and 10-30 cm in width.

The apparatus may include a 16 bit A/D converter, a 32-bit, and/or a 64-bit ADC. The apparatus may use Windows O/S, Linux or Linux variants, or custom, especially where the GUI of a built-in touchscreen display is used on a portable unit. The unit is also contemplated as having sufficient internal memory, e.g. from 16 MB to 4 GB, to run the various processors necessary for the electronics to run the spectrograph and display the output.

For a portable unit, power is contemplated for 25-30 W portable, where as for a desktop unit 100-200 W desktop is contemplated. It is also contemplated that the apparatus is mounted on a vehicle, or on a platform appropriate to the field in which the apparatus is being used, e.g. wherein the identified match is used in a system selected from the group consisting of: real-time detection of a roadbed explosive; assessment of diamond quality; real-time identification of chemical species within a plasma reactor environment; real-time identification of drilling fluids; real-time identification of hydrocarbon oil mixtures; real-time identification of constituents of a process stream at an inlet of a reaction vessel; real-time characterization of fuel at a fuel dispenser; real-time monitoring of reacting chemicals in semi-conductor manufacturing; real-time monitoring of reacting chemicals in pharmaceutical manufacturing; identification of a horticultural chemical; identification of a biochemical compound; identification of a polymer; authentication of a product; identification of a pathogen; identification of a toxin; real-time detection of a target compound on baggage in an airport; real-time detection of a target compound on shipping containers and boxes; real-time detection of a target compound in a water treatment facility; real-time detection of a target compound in smokestack emissions; real-time detection of a target compound in waste water; real-time detection of a target compound in a hazardous spill; real-time detection of a target compound on a law enforcement forensic sample.

The term "sample" means a liquid, solid, gas, mixture, and/or plasma, but also materials that are targeted and tested using the apparatus and methods described herein. Non-limiting examples of materials include roadbed surfaces— paved and unpaved, solids such as diamonds or crystalline materials, natural fibers, synthetic fibers, fabrics, polymers, co-polymers, powders, shavings, pellets or particles, metals, foil, alloys, ceramics, glass, human or animal tissue, hair, fur, dried human or animal fluids or excretions, fluids including chemicals within a reactor environment, oil and gas drilling fluids, hydrocarbon oil mixtures; constituents of a process stream in a reaction vessel, fuels at a fuel dispenser; chemicals in semi-conductor manufacturing and pharmaceutical manufacturing, horticultural chemical, agricultural products including vegetables, grains, meat, dairy products, fruit, wine, beer, beverages and herbs, biochemicals, pathogens including bacteria, fungi, viruses, yeast and mycoplasma, biological and chemical toxins, baggage surfaces, shipping containers and boxes, smokestack gases, and forensic samples for governmental, law enforcement, and industrial monitoring purposes.

The term "sample" may also include the substrate, surface, container or form on or in which a material is found. As a non-limiting example, a liquid sample may be enclosed in a testing cuvette or container, as part of a reaction chamber, in a holding pond, in a storage tank, or as a stream of liquid. A solid sample may be part of a soil sample, a swatch of fabric, a block, or tissue or cells from an animal, plant, or microorganism. A gas sample may be confined within a capture chamber, may be within a larger confined space, or may be part of emission column or cloud into the atmosphere.

It is also contemplated that the apparatus work with a Li ion battery or with standard 110/230 V AC power supply.

Figure 2:
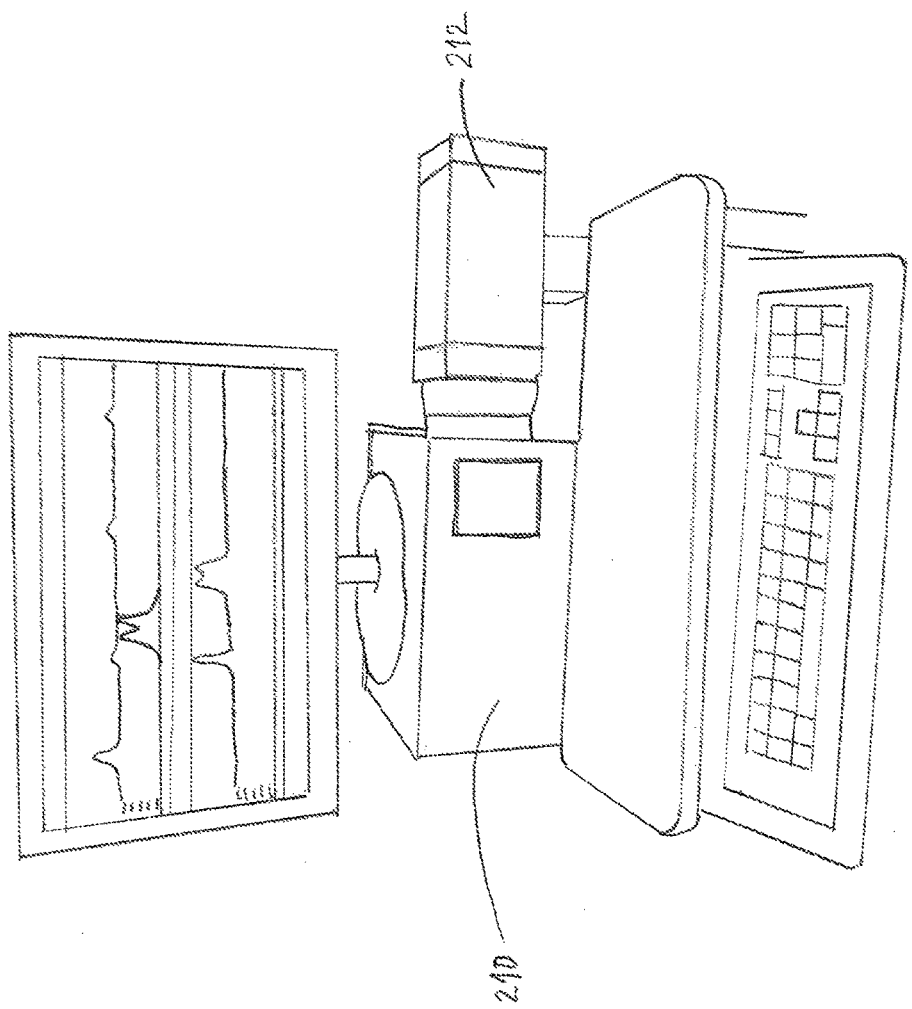
FIG. 2 is a photograph and shows a non-limiting example of a spectrograph and detector system connected to a computer having a keyboard and a display screen.
Figure 3:
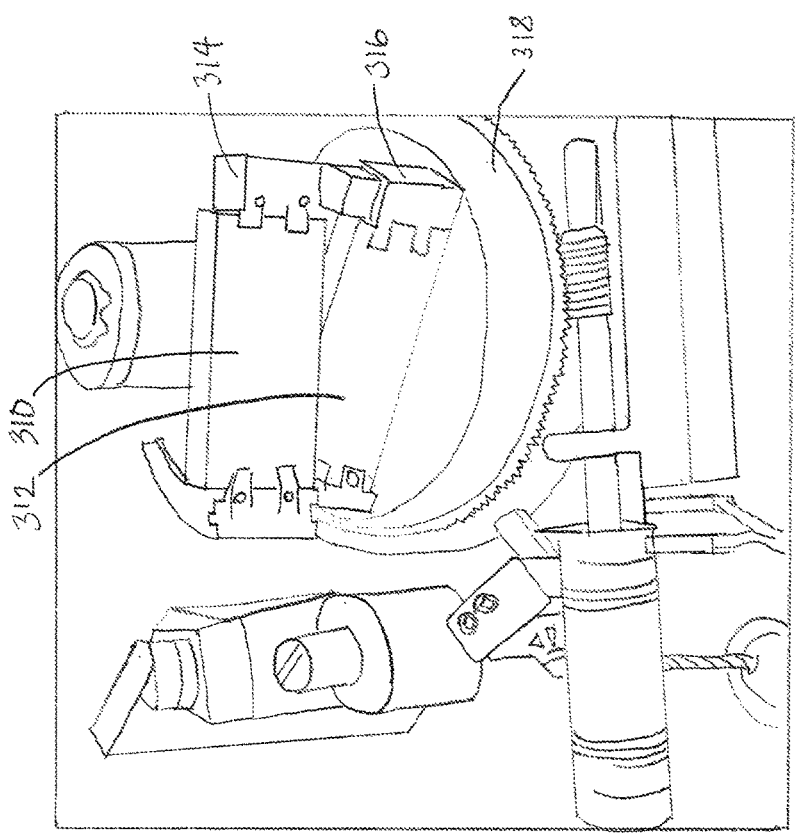
FIG. 3 is a photograph and shows a non-limiting example of hybrid grating and turret.
Figure 4:
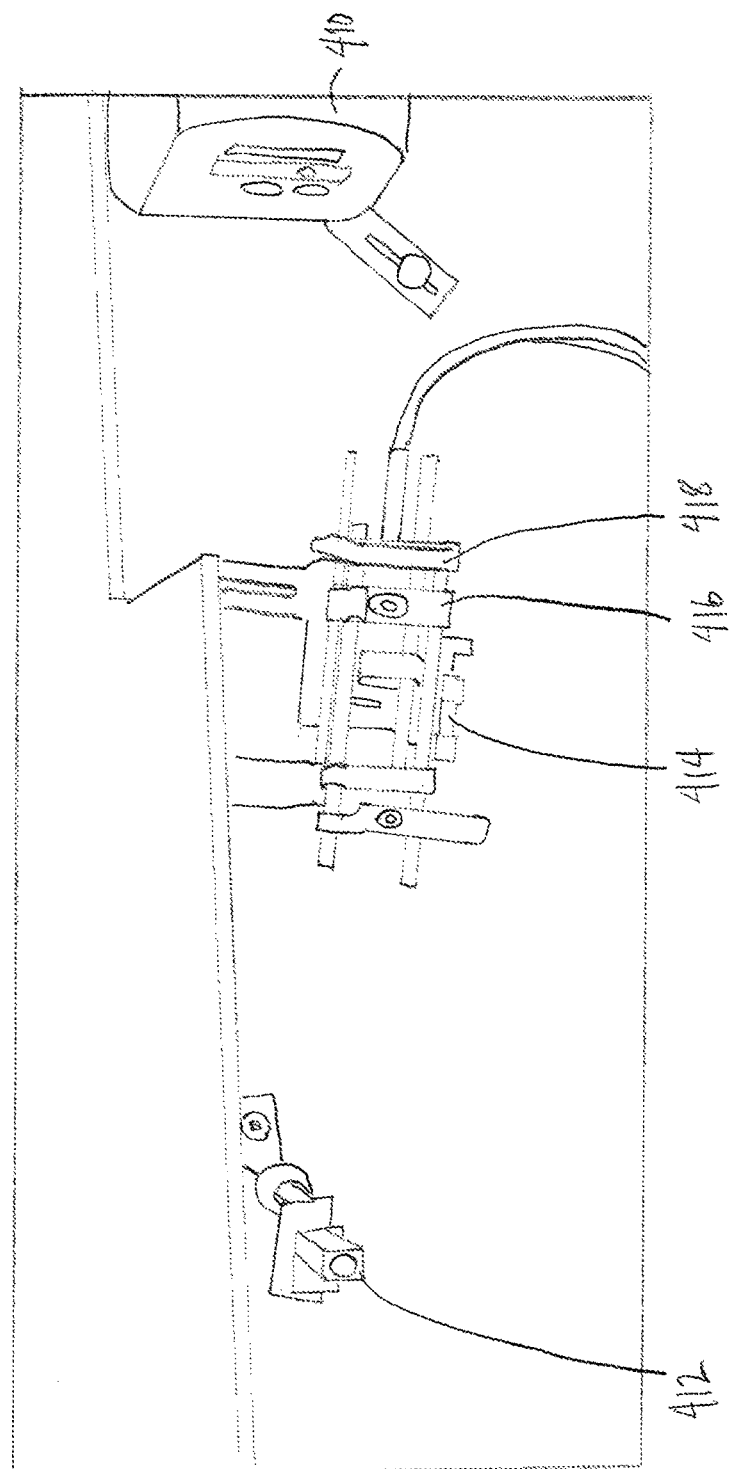
FIG. 4 is a photograph and shows a non-limiting example of collection optics and sample compartment layout for a desktop unit.

A computer controlled spectrograph 210 and detector system 212 is shown in FIG. 2. The designed hybrid grating system mounted inside the Acton spectrograph is shown in FIG. 3. FIG. 3 shows hybrid grating composed of selected diffraction gratings 310, 312, alignment frames 314, 316, which are used to aim the individual grating, and computer controlled rotation stage 318. The sample compartment and the collection optics showing the stand-off optical arrangement in the −180° backscattered configuration are shown in FIG. 4. FIG. 4 shows a raman spectrometer sample compartment layout comprised of a LASER output orifice 410, a sample 412, a singlet lens 414, a notch filter stack 416, and a proximal end of a fiber optic bundle 418. Notice that the laser table has tapped mounting holes on 1-inch centers which can be used to estimate the scale of the apparatus.

The present invention provides Raman spectral measurements with sensitivities and resolutions commensurate with what could be expected for original spectrographs when operated under normal (non-hybrid) conditions. Target specifications include 10 $cm^{-1}$ resolution with sensitivities capable of identifying the strongest transitions of a known analyte during a single laser pulse. Combinations of laser pulses, and different pulse powers are also provided.

In one non-limiting example, a 266 nm laser rejection filter is used prior to the fiber bundle to block scattered excitation. A 420 nm cut-off filter is used in front of the visible grating to block second order scatter. A 532 nm notch is sometimes used; the commercially available filter absorbs at 266 nm extensively such that it is less than optimal for dual wavelength work.

The typical setup uses two different 25×50 mm gratings stacked in a hybrid set. For the dual wavelength data shown, a 600 gr/mm 500 nm blazed grating is used to collect the visible spectra while a 1800 gr/mm blazed at 250 nm is used to collect the UV spectrum. The difference in groove density, and thus dispersion at these two wavelengths, is needed to insure spectral coverage of the detector array at the individual wavelengths used. In this configuration, the top section of the detector array contains UV data while the bottom contains visible data.

Figure 5:
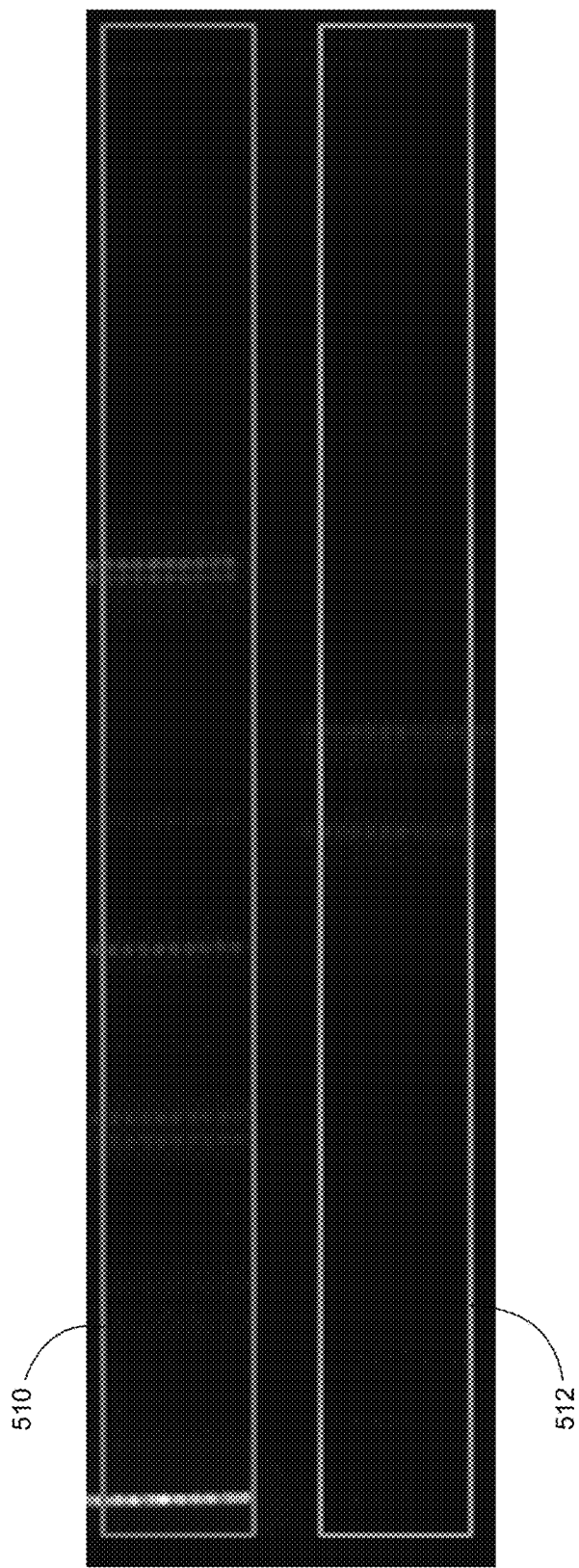
FIG. 5 is a photographic image and shows a non-limiting example of a detector array image.

The image of the detector array is shown in FIG. 5 which also displays the region of interest (ROI) for the two spectral regions (upper box 510—UV ROI, lower box 512—visible ROI). As can be seen in FIG. 5, the wavelength separated images of the individual fibers are observed. Each spectral image should contain 19 individual fibers. Only ~10 are included in the ROI in each case because of detector size constraints. The remaining fiber images are off the top (or bottom) of the detector and their intensity is lost. The use of a larger detector as described herein may increase the detector efficiency.

The output of the fiber is then dispersed onto the convex collection mirror inside the spectrograph and collimated toward the hybrid grating stack. The collimated beam can be 25 to 200 mm in diameter or more depending upon the manufactures specifications. Customized sizing of gratings is required to optimize the diffraction efficiency through choice of grating size (both width and height) as well as blaze wavelength and density. Selection of individual grating components to make up the hybrid grating stack is contemplated as within the scope of the invention.

It is also contemplated as within the scope of the invention to use VPH transmission gratings. The gratings work much like conventional surface relief reflection gratings, except in transmission. They are periodic phase structures, whose fundamental purpose is to diffract different wavelengths of light from a common input path into different angular output paths. The phase of incident light is modulated as it passes through a volume of the periodic phase structure, hence the term "Volume Phase".

Example—Cyclohexane

Figure 6:
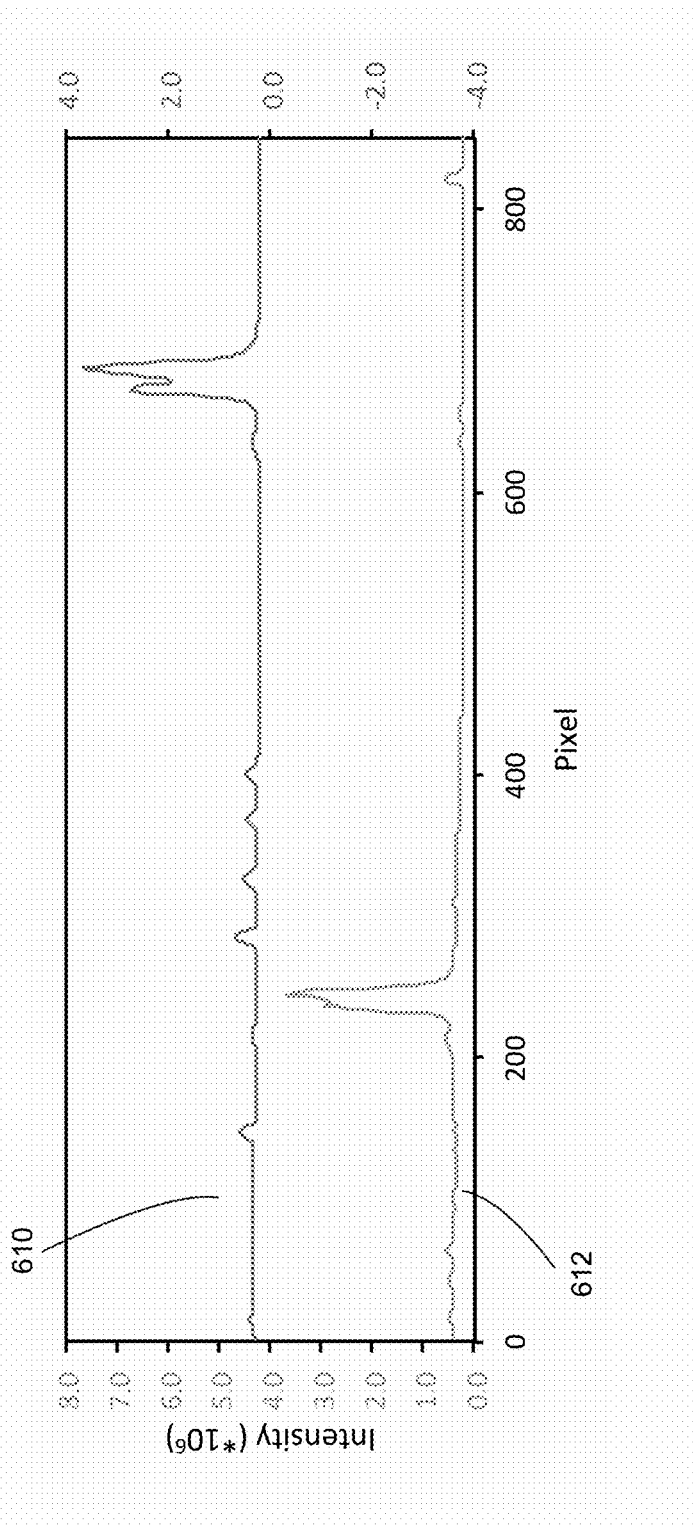
FIG. 6 is a line graph and shows a non-limiting example of Rayleigh-filtered Raman scatter from cyclohexane using both 266 nm (top trace) and 532 nm (bottom trace) light to excite the sample. Axis labels are the color of the spectrum they represent.

Cyclohexane has been studied extensively and is used as a standard in Raman spectroscopy cross-section studies. A set of spectra obtained after excitation of a sample of cyclohexane in a quartz cuvette with 12 mJ total laser power (3 mJ at 266 and 9 mJ at 532 nm) is shown in FIG. 6. The top, or upper, trace 610 is obtained by summing the columns of pixels within UV spectral ROI while the bottom, or lower, trace 612 is the sum of the pixel columns in the visible ROI. Signal to noise in both of these spectra is excellent. The major bands in the visible spectrum are in fact UV signal 2nd-order diffracted into the visible region. When a 420 nm cut-off filter is added in front of the visible grating to block the UV components, the visible spectrum is revealed (FIG. 7, top trace 710).

Figure 7:
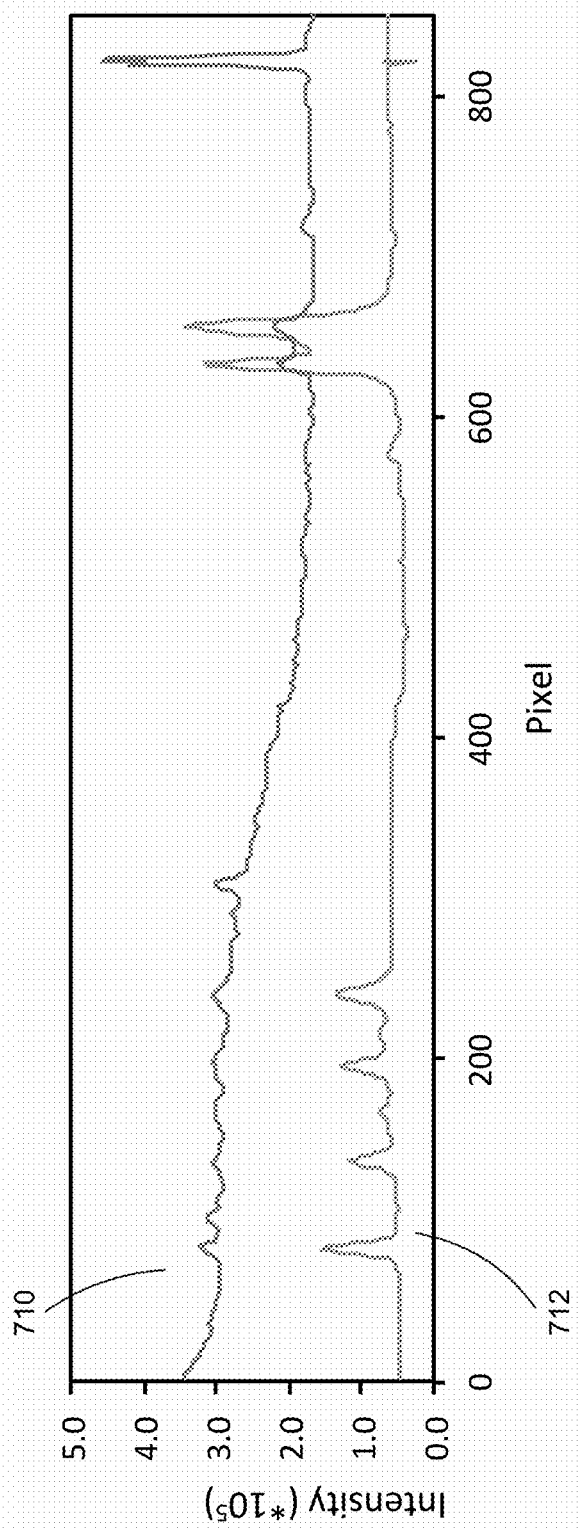
FIG. 7 is a line graph and shows a non-limiting example of Rayleigh-filtered (top trace) and Rayleigh- and UV filtered (bottom trace) 532 nm Raman scatter from cyclohexane. Both 266 nm and 532 nm light were used to excite the sample but only the visible components are shown.

As seen in FIG. 7 with the addition of the UV filter, there remains a significant background contribution from stray Rayleigh scatter to the observed intensity. The bottom trace 712 is obtained when a 532 nm laser rejection filter is placed before the collection optics. This rejection filter also absorbs light of wavelengths below 300 nm thus eliminating both the second order scatter and the excessive background due to stray Rayleigh from the observed spectrum.

Comparison between the 266 nm and 532 nm spectra reveals that the UV spectrum is more intense by more than an order of magnitude. The theoretical v4 dependence of scattering cross-section provides a factor of between 16-20 increase. Given that the UV excitation pulse is lower intensity than the visible and that the spectrograph is less sensitive to the visible than it is to UV, it is clear that UV excitation is more effective in observing the Raman spectrum of this analyte.

Example—Acetonitrile

Figure 8:
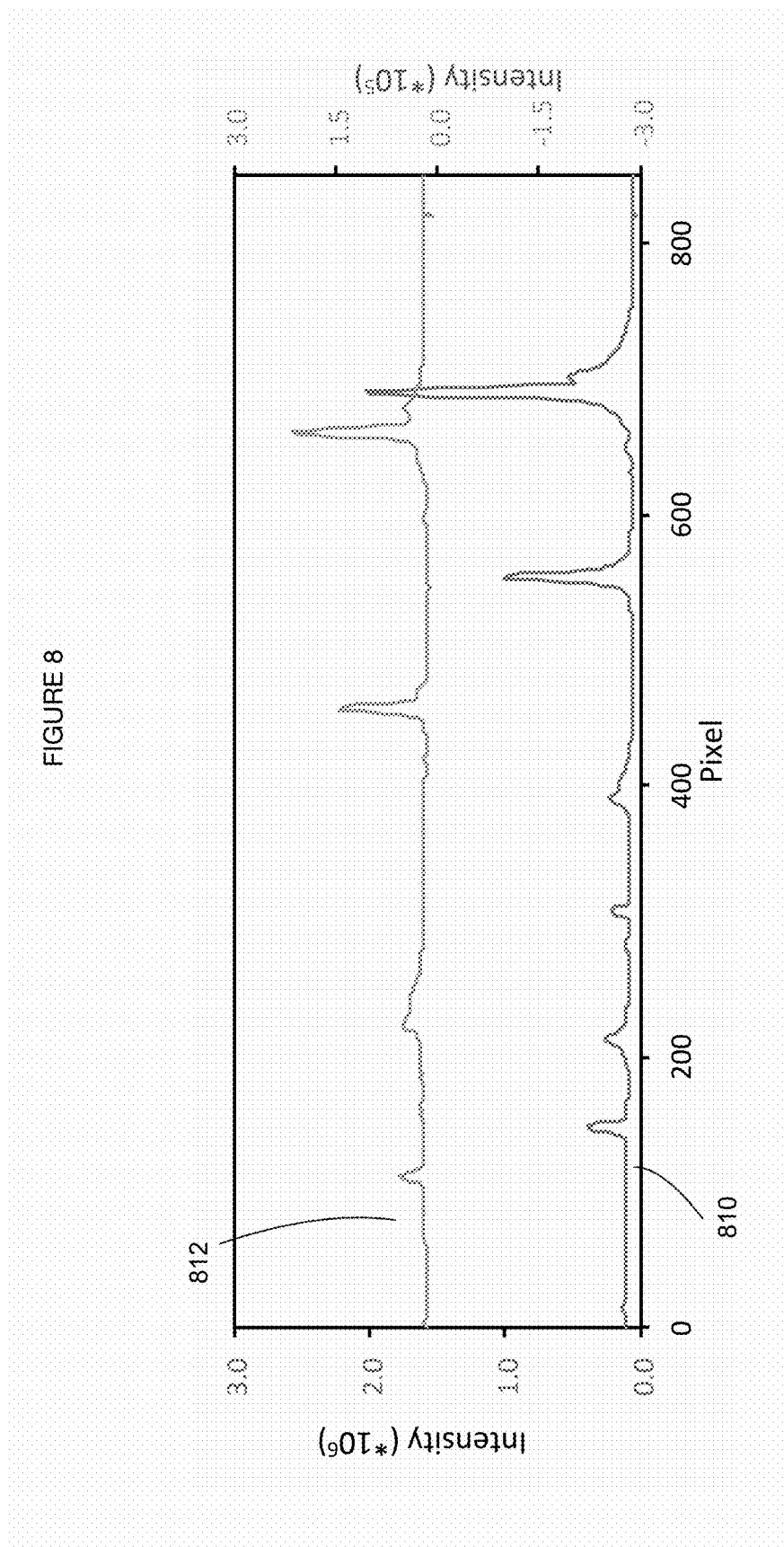
FIG. 8 is a line graph and shows a non-limiting example of Rayleigh-filtered and UV unfiltered 266 nm Raman spectrum (bottom trace) and laser rejection filtered Raman spectrum (top trace) 532 nm Raman scatter from acetonitrile.

Similar spectra are collected for acetonitrile as shown in FIG. 8. The figure includes the 266 nm Raman spectrum 810 along with the 532 nm laser rejection filtered visible spectrum 812. Note that the difference in observed intensity between the two spectra is again an order of magnitude. Clearly, for samples that do not absorb at 266 nm or 532 nm the increase in scattering cross-section for UV excitation makes 266 nm the excitation wavelength of choice.

Example—Acetone

Figure 9:
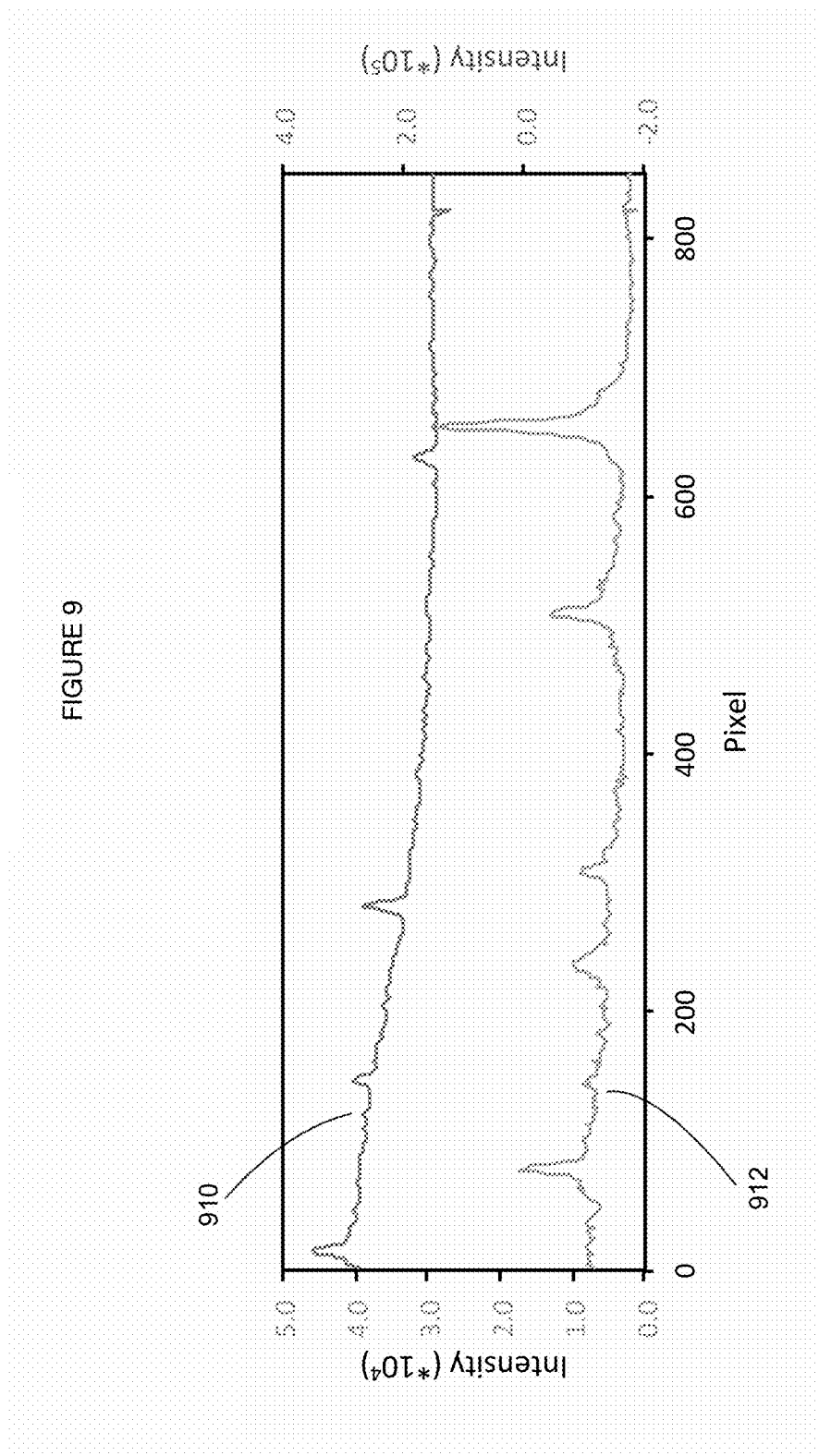
FIG. 9 is a line graph and shows a non-limiting example of Rayleigh-filtered and UV unfiltered 266 nm Raman spectrum (top trace) and laser rejection filtered 532 nm Raman scatter (bottom trace) from acetone.

The feasibility of using UV excitation on samples that absorb in this region (i.e., aromatic materials, ketones, etc.) is tested by measuring the Raman spectra at both 266 and 532 nm for acetone. The acetone spectrum is shown in FIG. 9. It is clear from the set of spectra that the 266-nm excitation 910 does not allow a discernible spectrum to be recorded while the 532-nm spectrum 912 is recorded with relative ease. For this solvent, the absorption of both the excitation pulse and the scattered wavelengths within the sample is a concern when UV excitation is used. The possibility of absorption is of no concern for the visible spectrum because the material does not absorb at these wavelengths. Thus, even with the nearly 20 fold decrease in scattering cross-section, the 532-nm excitation Raman spectrum 912 is much more easily observed than the same spectrum taken using 266 nm laser pulses 910.

Example—Toluene

Figure 10:
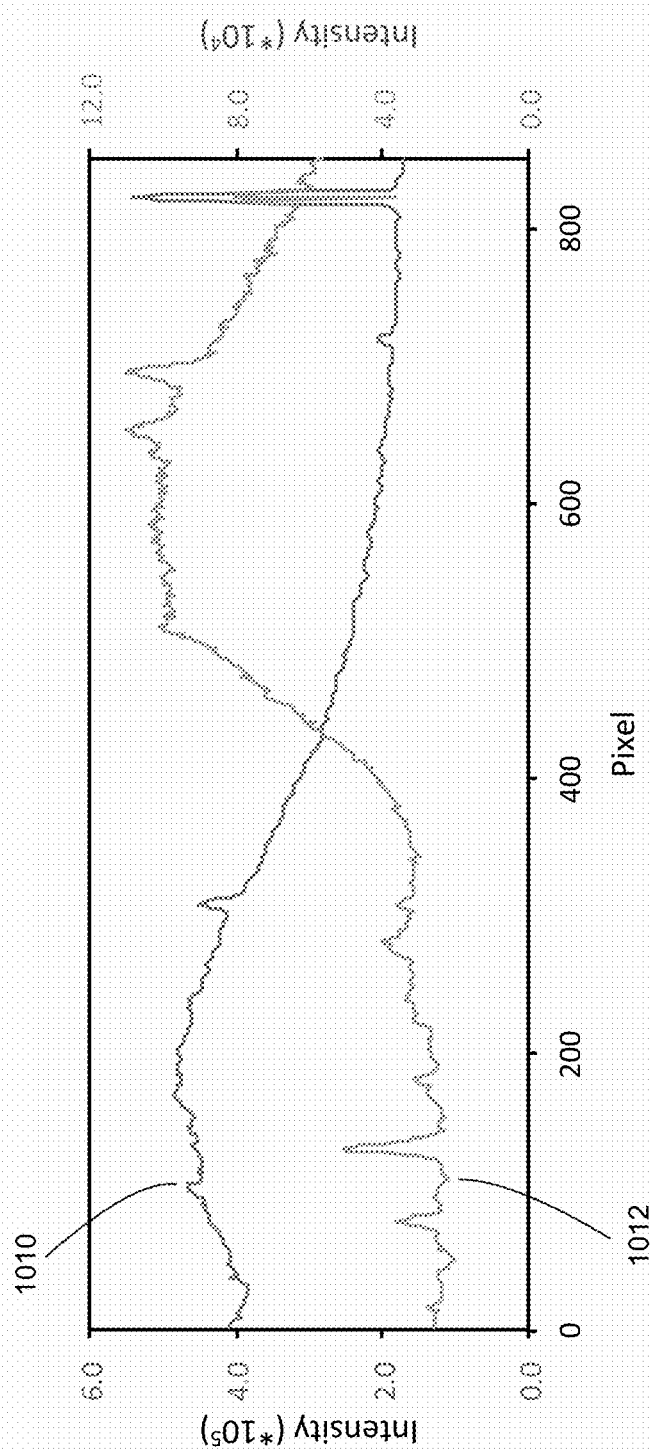
FIG. 10 is a line graph and shows a non-limiting example of Rayleigh-filtered and UV unfiltered 266 nm Raman spectrum (top trace) and laser rejection 532 nm Raman spectrum (bottom trace) from toluene.

An additional example of absorbing material is included in FIG. 10 where toluene spectra are displayed. Examination of the top trace 1010 shows that 266-nm excitation does not allow a discernible spectrum to be recorded in this case, similar to what is observed for acetone described above. Significant fluorescent background conspires with absorption to hide the weak Raman signals when 266 nm light is used. Here again, the 532 nm spectrum 1012 is recorded with ease, although a significant 2nd order diffraction of the ultraviolet emission signal is observed through the visible notch filter. Additional internal filtering may be used to remove artifact signal from the trace; it is shown in this case as a illustration of this potential problem.

Clearly, when absorption of the excitation pulse and scattered signals is significant, even with the increase in scattering cross-sections in the ultraviolet and the potential for resonance enhancement that approaching an absorptive transition implies, the visible scatter is more easily observed in practice. The difference in penetration depth is not compensated by the increase in scattering cross-sections. Solid samples have limited penetration depths due to particle scattering and thus may exhibit different behavior than observed in the case of liquids.

Example—Solid Samples

Figure 11:
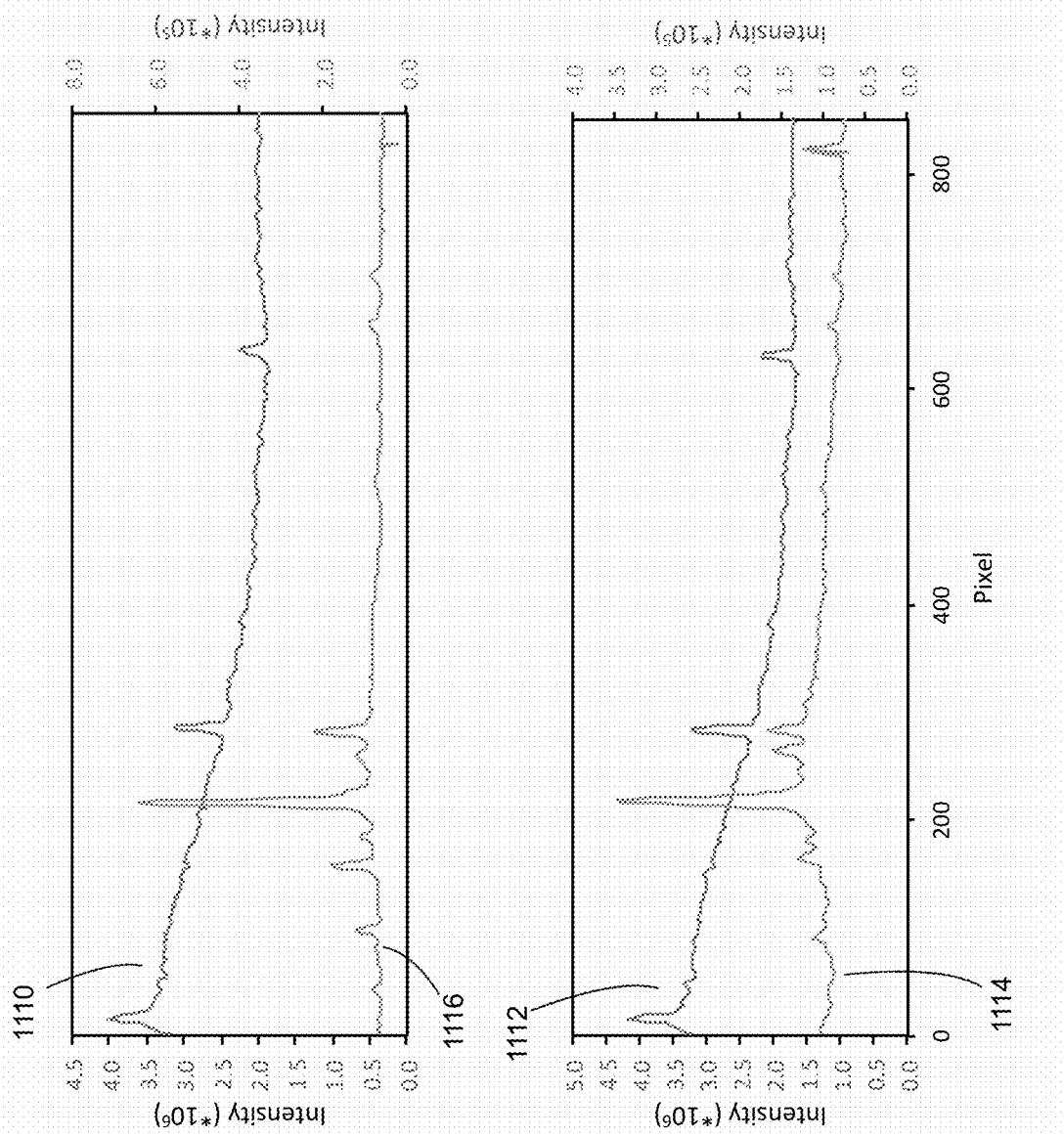
FIG. 11 is a line graph and shows a non-limiting example of Rayleigh-filtered and UV unfiltered 266 nm Raman spectrum (top traces) and laser rejection filtered 532 nm Raman spectrum (bottom traces) from nitroaromatic solids. Top set are for 4-nitrotouene while the bottom set are for 2,4-dinitrotoluene.

Referring now to FIG. 11, Solid solid samples of 4-nitrotoluene and 2,4-dinitrotoluene are ground into fine powders and placed between quartz plates. Nitroaromatic materials have low fluorescent yields due to rapid photochemical deactivation processes making them good candidates to observe resonance enhancements. The resulting spectra are shown in FIG. 11, with the top panel showing spectra for 4-nitrotoluene, and the bottom panel showing spectra for 2,4-dinitrotoluene. The 266 nm spectra 1110, 1112 do not contain Raman spectral information because of significant background luminescence which accumulates faster than the weak Raman signals; subtraction of the pair of UV spectra results in random noise with no discernible spectral peaks being observed. The visible spectra 1116, 1114 are far superior in this regard and very clean spectra with high signal to noise are readily recorded.

It is contemplated as within the scope of the invention that other commonly targeted similar compounds would also be readily detectable using the invention herein. For example, compounds such as trinitrotoluene (TNT), Pentaerythritol tetranitrate (PETN), Research Department Explosive (RDX), RDX-based explosives including C4 and Semtex, triacetone triperoxide (TATP), Composition B (a castable mixture of RDX and TNT), Urea Nitrate, and Tetranitronaphthalene (TENN) are well-known targets when detecting for explosive devices.

Figure 12:
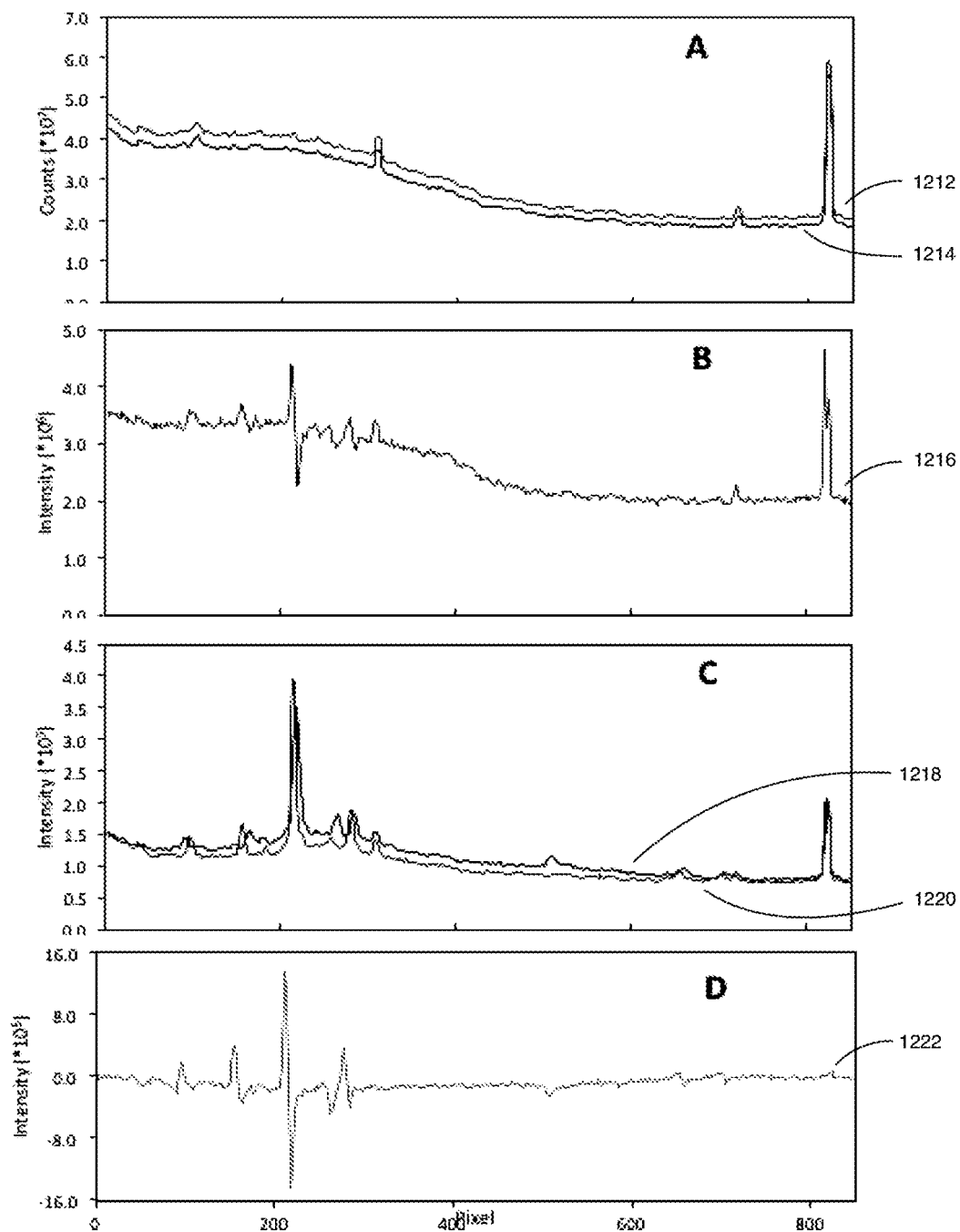
FIG. 12 is a line graph and shows a non-limiting example of UV filtered spectra of 4-nitrotoluene and 2,4-dinitrotoluene and shown in the top panel (panel A). Raman spectral information is included in these spectra as demonstrated by subtraction (panel B). Laser rejection filter allows the individual traces to be observed (panel C) and the subtraction of the two spectra shows direct similarity to the difference spectrum in panel D.

Referring now to FIG. 12, to highlight the difference between visible and UV spectral accumulation, the following series of spectra are presented. FIG. 12 shows line graphs of UV filtered spectra of 4-nitrotoluene 1212 and 2,4-dinitrotoluene 1214 are shown in the top panel (panel A). Raman spectral information 1216 is included in these spectra as demonstrated by subtraction (panel B) 1216. Laser rejection filter allows the individual traces 1218, 1220 to be observed (panel C) and the subtraction of the two spectra 1222 shows direct similarity to the difference spectrum in panel D. The visible laser rejection notch filter is removed and stray Rayleigh from the laser is accumulated on the detector along with weak Raman scatter. A 420 nm cut-off filter is placed within the spectrograph to remove the 2nd order scatter (FIG. 12, top). The resulting spectra have significant background intensities and it is difficult to see Raman transitions in the individual spectra. Subtraction of the two spectra allows removal of the stray light components leaving behind the weak Raman spectra as a difference spectrum. When the visible laser rejection notch filter is replaced in the system, clear spectra are again observed, although it is not possible to record the UV spectra in this configuration. However, the difference spectrum obtained by subtraction of the two visible spectra confirms that the recovered spectra are authentic and that the invention collects both UV and visible spectra simultaneously.

Dual Resolution Spectroscopy

If the entire Raman spectrum is to be recorded (~4000 $cm^{-1}$), the resolution must be relatively low (>10 $cm^{-1}$). The fundamental Raman bandwidth for solids and liquids at room temperature is on the order of 3-5 $cm^{-1}$, thus setting the high limit of resolution to be ~4 $cm^{-1}$. In the past, the choice was to record only a fraction of the entire Raman spectrum at high resolution or to collect the entire spectrum at low resolution. Information is lost in either case.

In the present invention, a hybrid grating turret is arranged to have two visible gratings of different grove density, allowing two individual spectra to be observed simultaneously. Specifically, the high resolution spectrum was recorded using a 1800 gr/mm grating while the lower resolution spectrum is recorded using a 600 gr/mm gating. The blaze wavelength is 500 nm for both gratings.

Figure 13:
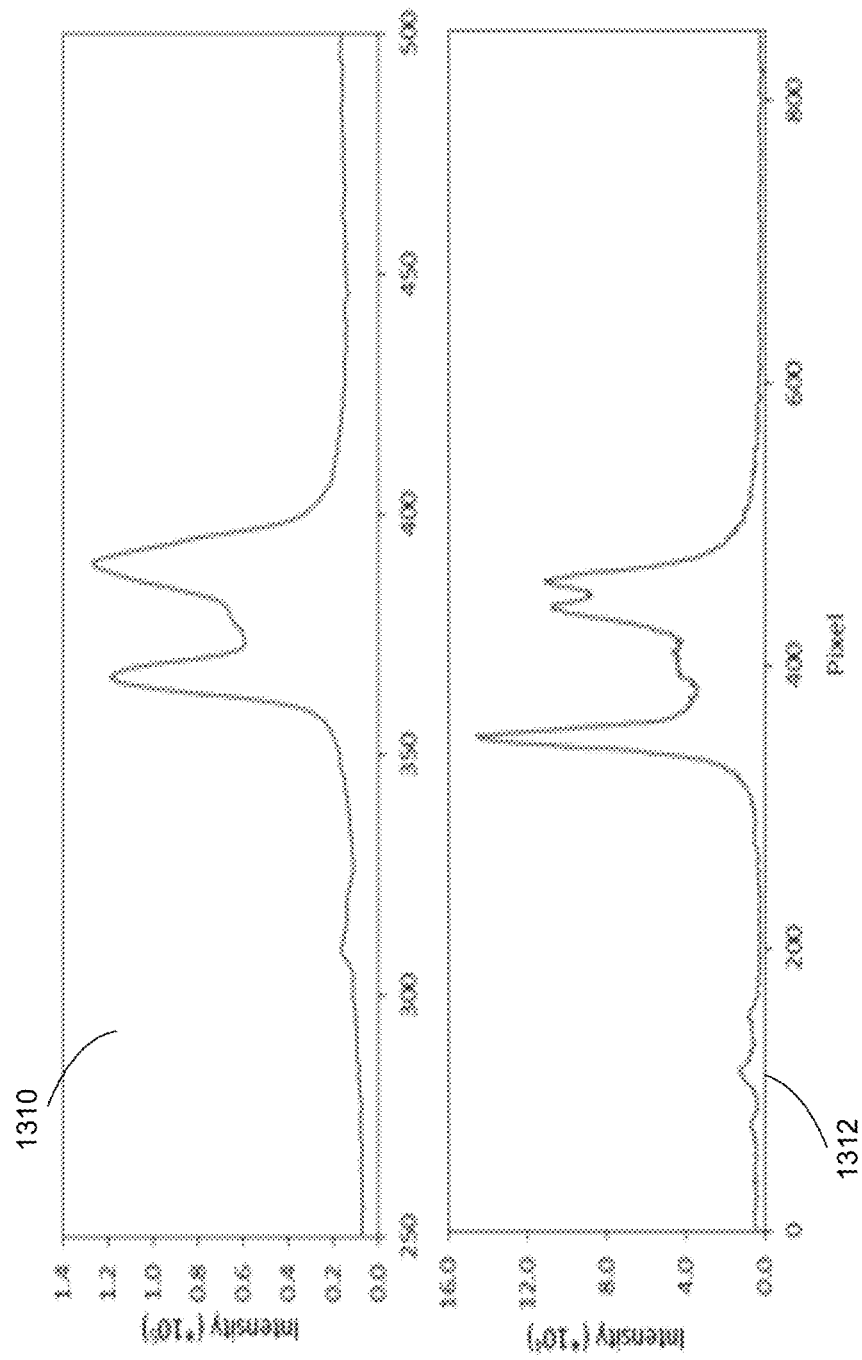
FIG. 13 is a line graph and shows a non-limiting example of unfiltered 266 nm Raman spectra of cyclohexane C—H stretching region taken at low resolution (upper) and the same spectral region taken at high resolution (lower).

FIG. 13 compares the high 1312 and low 1310 resolution spectra for cyclohexane. Notice the band shapes change significantly with more structure observed in the high resolution spectrum. Slight improvements in the high resolution spectrum 1312 is observed when a 2400 gr/mm grating is utilized. The trade off is in the fraction of the total Raman spectrum recorded.

The low resolution spectrum 1310 includes only 250 pixels of the 925 pixels that were recorded within the ROI accounting for nearly 2500 $cm^{-1}$ of the Raman spectrum. The entire high resolution spectrum 1312 consisting of 925 pixels is shown in FIG. 13, accounting for less than 800 $cm^{-1}$ of the entire Raman spectral range. At high resolution, at least four more spectra are required to collect the entire Raman spectrum.

Figure 14:
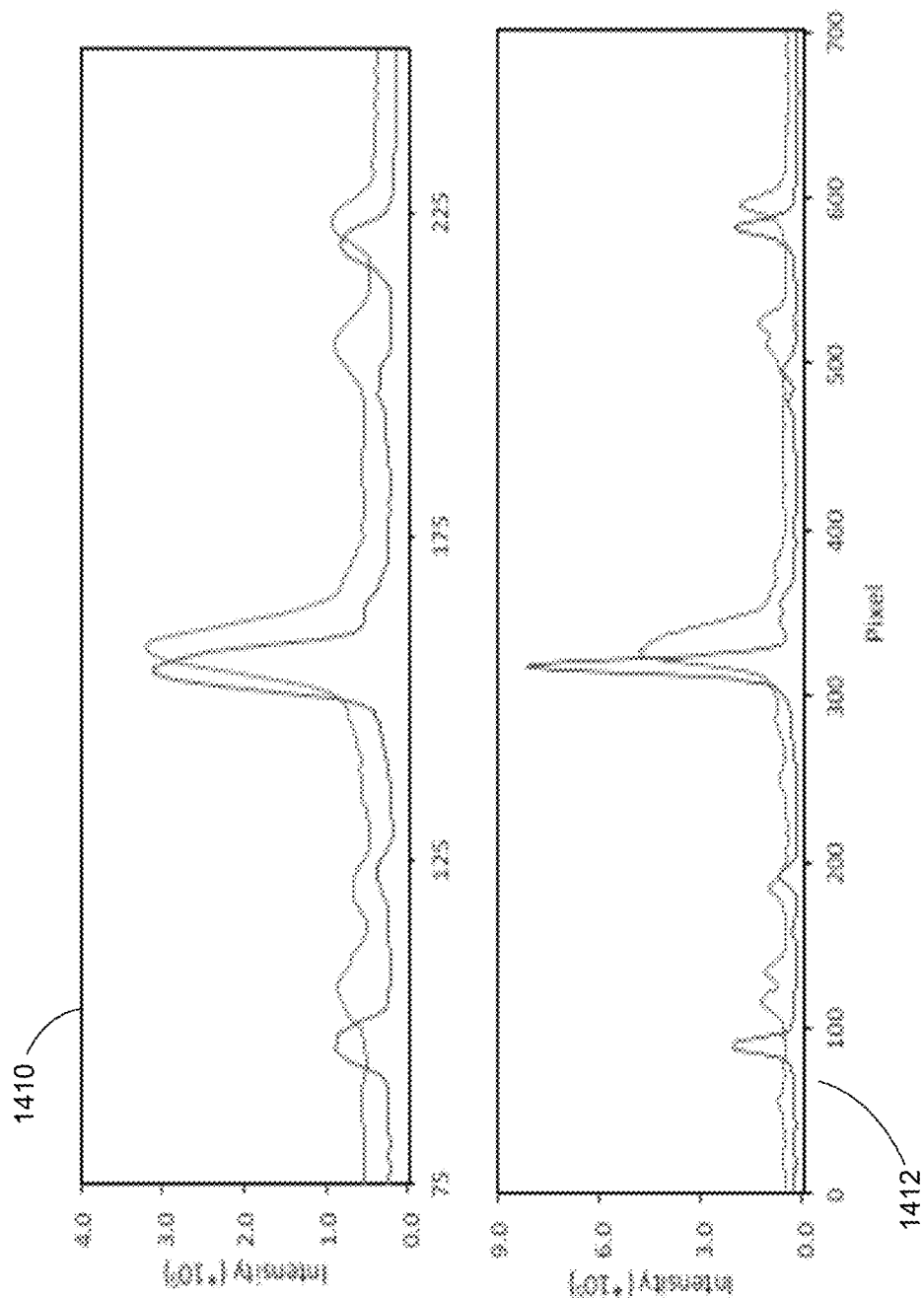
FIG. 14 is a line graph and shows a non-limiting example of Raman spectral comparison of 4-nitrotoluene and 2,4-dinitrotoluene taken at low resolution (upper) and high resolution (lower) for 532-nm excitation.
Figure 15:
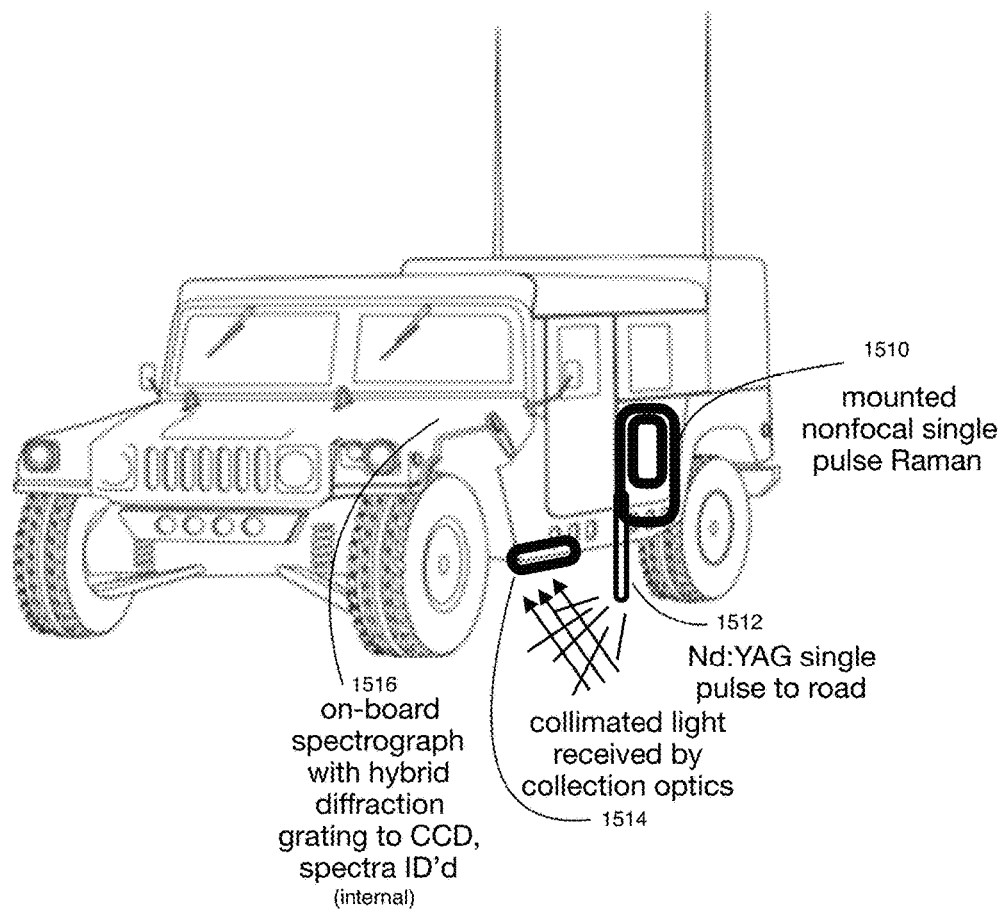
FIG. 15 is a line drawing and shows an illustration of an apparatus according to the present invention used in an application for detection of target compounds from a moving vehicle.

In FIG. 14, turning to the nitroaromatic solids, the low resolution spectra 1410 share very similar characteristics. Previously, the major $NO_2$ antisymmetric stretch is characteristic for substituted nitroaromatics and the spectrum includes a single band for the 4-nitrotoluene and a pair of bands for the 2,4-dinitrotoluene for this transition. In the present invention, low resolution spectra 1410 have significant overlap between the bands, and in both cases, the bands appear as single transitions. The high resolution spectra 1412 shown in the bottom panel of FIG. 14 illustrates that the dinitrotoluene spectrum (blue) shows overlapping transitions while the mononitrotoluene spectrum remains a single sharp transition. More information is available in the high resolution spectrum 1412 but only 25% of the entire Raman spectrum is included. The low resolution spectrum 1410 shows only a portion of the spectral region collected (only 250 of 925 pixels are shown).

To address an additional problem where distributing signal over multiple gratings decreases signal intensity due to dispersion in each grating, a factor proportional to the number of gratings used, the invention in another aspect increases the overall efficiency of light collection, coupling that light into the fiber, dispersing the fiber output into the hybrid grating stack correctly, and collecting the diffracted intensity fully in order to mitigate signal losses at the detector.

In this non-limiting preferred embodiment, there is provided a unique optical collection configuration that allows the coupling of scattered light from a low intensity, high power, excitation source to be efficiently coupled into a collection fiber. High excitation pulse powers can be used while simultaneously avoiding sample degradation and multiphoton effects and alleviating the need for deep penetration depths; samples that are difficult to measure using excitation wavelengths can be studied. This optical collection configuration also avoids the need for accurate focal plane adjustments by collecting light from a large sample cross-section while simultaneously matching the collected light to the numerical aperture of the fiber bundle. Accordingly, rapid analysis of moving samples is achieved with unprecedented efficiency.

Once the Raman scatter is coupled into the fiber, it is dispersed into the spectrograph. In the current embodiment, 200 um fibers are used. The alignment of the 19 individual fibers into a stack serves the same purpose as an entrance slit on the spectrograph. Using 200 um fibers amounts to a 200 um slit adjustment. Larger numbers of smaller-diameter fibers would allow much higher resolution (smaller "slit" widths) while maintaining high through-put.

In another embodiment, smaller diameter fibers are incorporated in the fiber bundle. The optimal fiber diameter will depend upon the detector pixel size. The detector pixel size of the system used in this study is ca. 25 μm; the standard pixel size for current detector systems is 14 μm. Matching the fiber diameter to the pixel size will optimize both resolution and collection efficiency. While the relationship between pixel size and recorded signal is complex, it is clear that collecting the entire signal on a single detector pixel will be more efficient than dispersing the same signal over multiple pixel units. An increase in the efficiency of more than an order of magnitude can be expected.

The output of the fiber is then dispersed onto the collection mirror inside the spectrograph and collimated toward the hybrid grating stack. The collimated beam is 70 mm in diameter, but could range from 25 mm to 150 mm. Customizing the grating size to optimize the beam is contemplated as within the scope of the invention.

After diffracting off of the grating stack, the signal intensity is dispersed through a solid angle that will depend upon parameters such as wavelength of interest, the blaze angle, and the groove density. Selecting these parameters to match the needs of the environment is important in optimizing the efficiencies of spectrograph. Custom gratings are contemplated as within the scope of the invention to optimize these parameters to match the data collection needs while also obtaining the correct size of grating.

Accordingly, a single-pulse stand-off Raman spectroscopy system using several excitation wavelengths is provided as a viable solution for detection of trace materials.

The operational utility of multi-wavelength and multi-resolution spectroscopy is demonstrated by collecting two different spectra simultaneously. The optical configuration used is shown to allow stand-off detection at distances of more than 10 meters, up to 40 meters. The spectra collected allow detailed evaluation of Raman scattering signatures for several classes of compounds within one laser pulse in both the UV and visible spectra regions. The systems provide at least four, and up to as many as eight, different spectra being collected simultaneously within a single laser pulse under stand-off conditions.

Identification

Once spectra are obtained, the apparatus can include identification software, such as RSIQ software, from Raman Systems, a business unit of Agiltron. The RSIQ software, and others like it, have a built-in library or have connectability to an online library of the Raman spectra of known materials, such as the one-click ID-Find program.

Referring now to FIGS. 15-18, FIG. 15 shows how an apparatus 1510-1512-1514-1516 according to the present invention may be used in an application for detection of target compounds from a moving vehicle, such as a military personnel carrier like a "Hummer". An apparatus comprises a mounted nonfocal single pulse Raman 1510, transmitting a single pulse from a Nd-YAG 1512 to a road surface, where collimated light is received by collection optics 1514, which is the transmitted to and analyzed by an on-board spectrogrpah with hybrid diffraction grating to CCD 1516, where the spectra is identified. An apparatus would be mounted on such a vehicle so that roadway or other surrounding surfaces could be accessed by the laser for Raman analysis. Target compounds in this example would be chemicals related to explosives.

Figure 16:
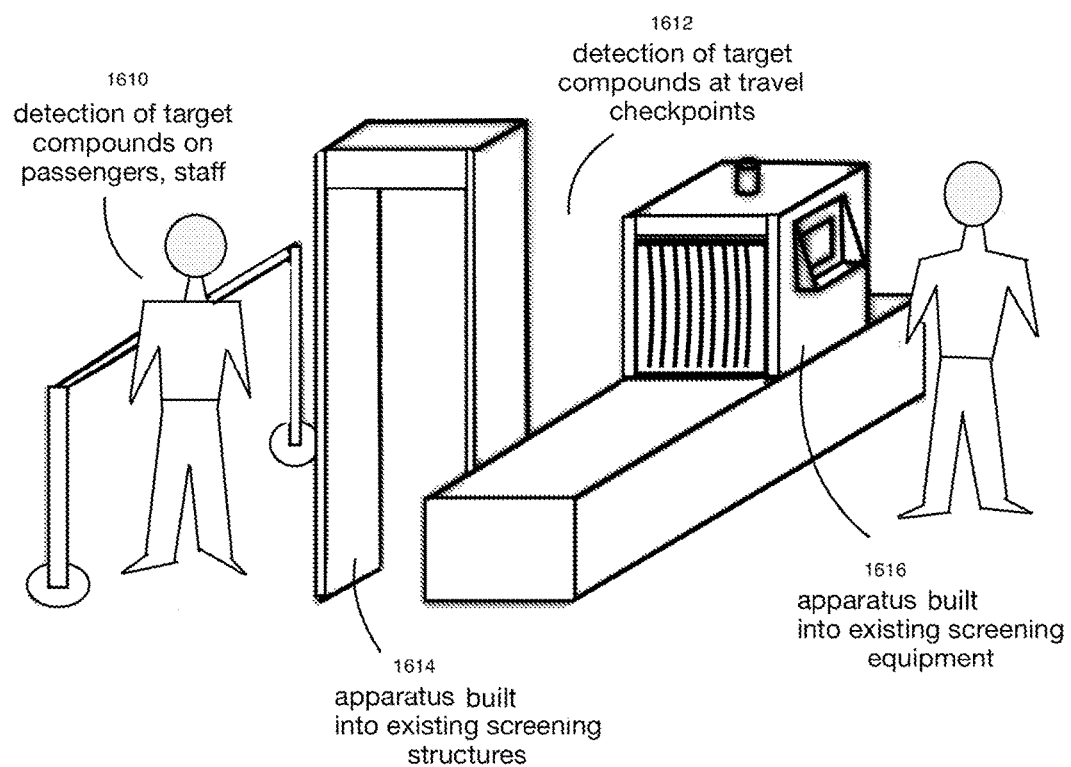
FIG. 16 is a line drawing and shows an illustration of an apparatus according to the present invention used in an application for detection of target compounds at a secure checkpoint such as an airport or other access-controlled facility.

FIG. 16 shows how an apparatus according to the present invention may be used in an application for detection of target compounds at a secure checkpoint such as an airport or other access-controlled facility. An apparatus according to the present invention is mounted on a stationary platform, or could be used in a portable wheeled, or handheld device so that baggage, passengers, guests, or other surrounding surfaces are accessed by the laser for Raman analysis. Target compounds in this example would be hazardous materials, biologicals, toxins, chemicals related to explosives, illegal drugs, weapons, or other contraban. FIG. 16 shows detection apparatus 1610 built into existing screening structures 1614 and used to detect target compounds on passengers and staff. FIG. 16 also illustrates the apparatus exemplified as a checkpoint apparatus 1612 built into existing screening systems 1616 and used to detect target compounds at travel checkpoints.

Figure 17:
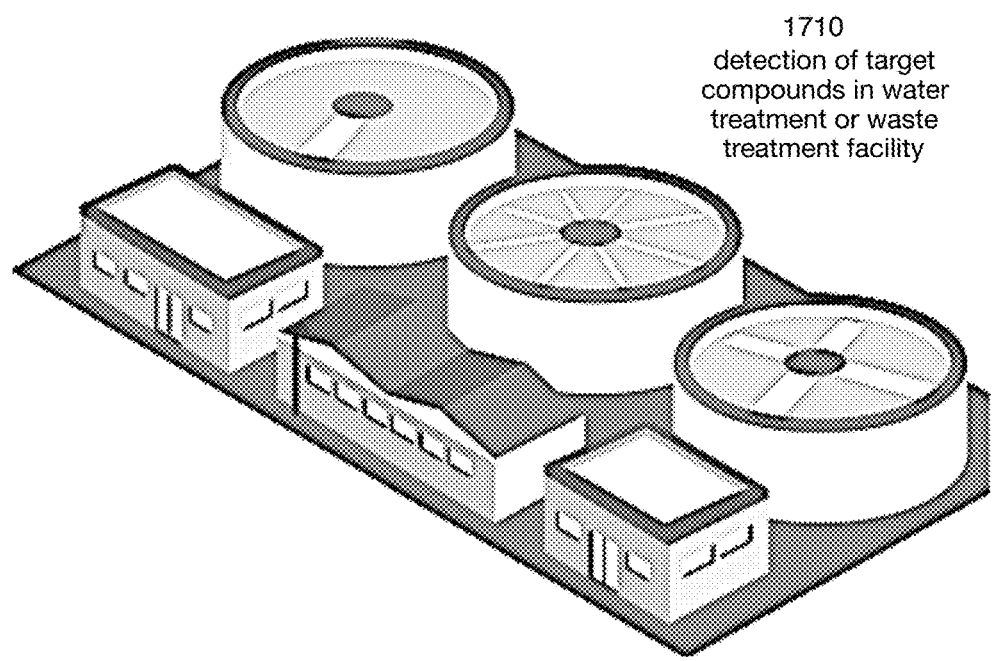
FIG. 17 is a line drawing and shows an illustration of an apparatus according to the present invention used in an application for detection of target compounds at a water treatment plant.

FIG. 17 shows how an apparatus according to the present invention may be used in an application for detection of target compounds at a water treatment facility or other utility. An water treatment plant installed apparatus 1710 is mounted on a stationary platform, or could be used in a portable wheeled, or handheld device so that sample surfaces are accessed by the laser for Raman analysis. Target compounds in this example would be chemicals related to toxins, contaminants, and so forth.

Figure 18:
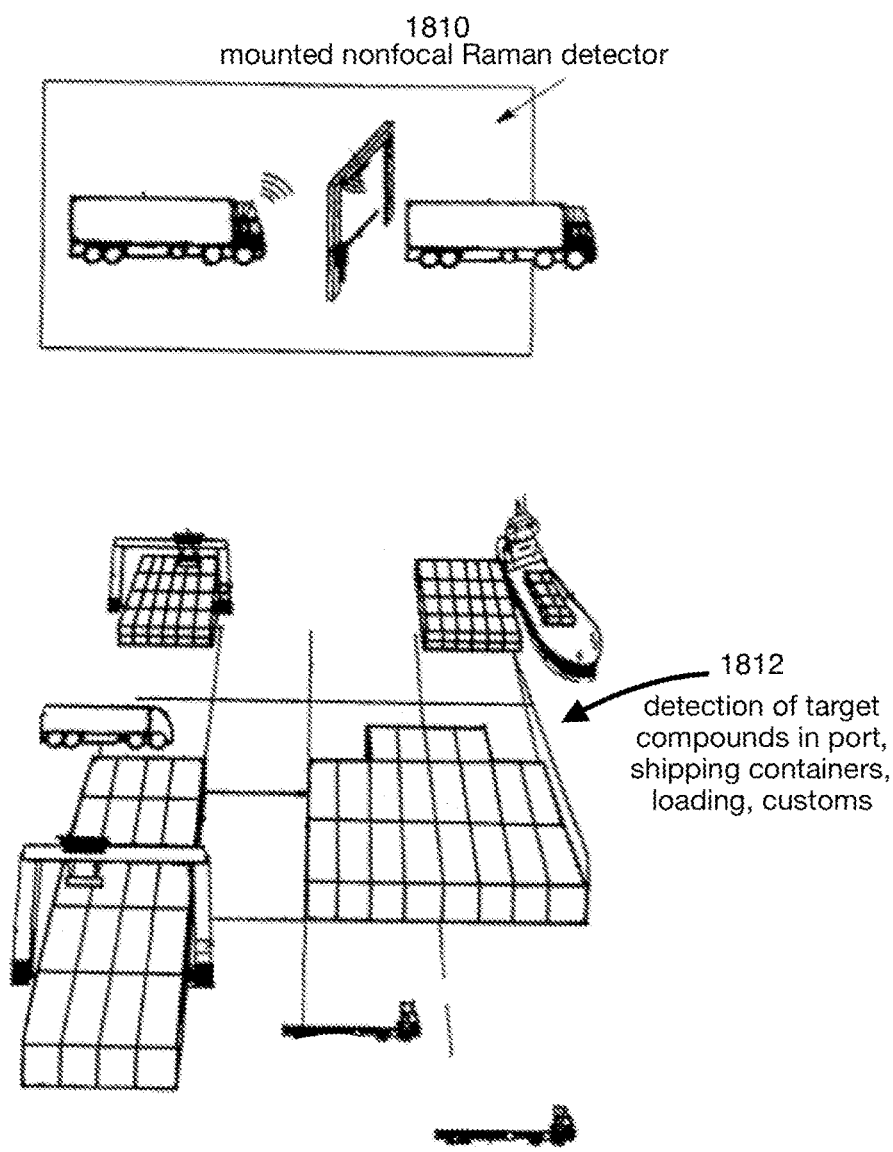
FIG. 18 is a line drawing and shows an illustration of an apparatus according to the present invention used in an application for detection of target compounds in shipping or transport.

FIG. 18 shows how an apparatus according to the present invention may be used in an application for detection of target compounds at a shipping or transportation hub, port or similar facility. An apparatus configured for use at a port could be mounted on a stationary platform 1810, could be used in a movable detector archway 1812, a portable wheeled device 1812, or a handheld device 1812 so that shipments, containers, trucks, storage, stevedors, passengers, visitors, or other surrounding surfaces could be accessed by the laser for Raman analysis. Target compounds in this example would be chemicals related to explosives, illegal drugs, weapons, or other contraban.

Figure 19:
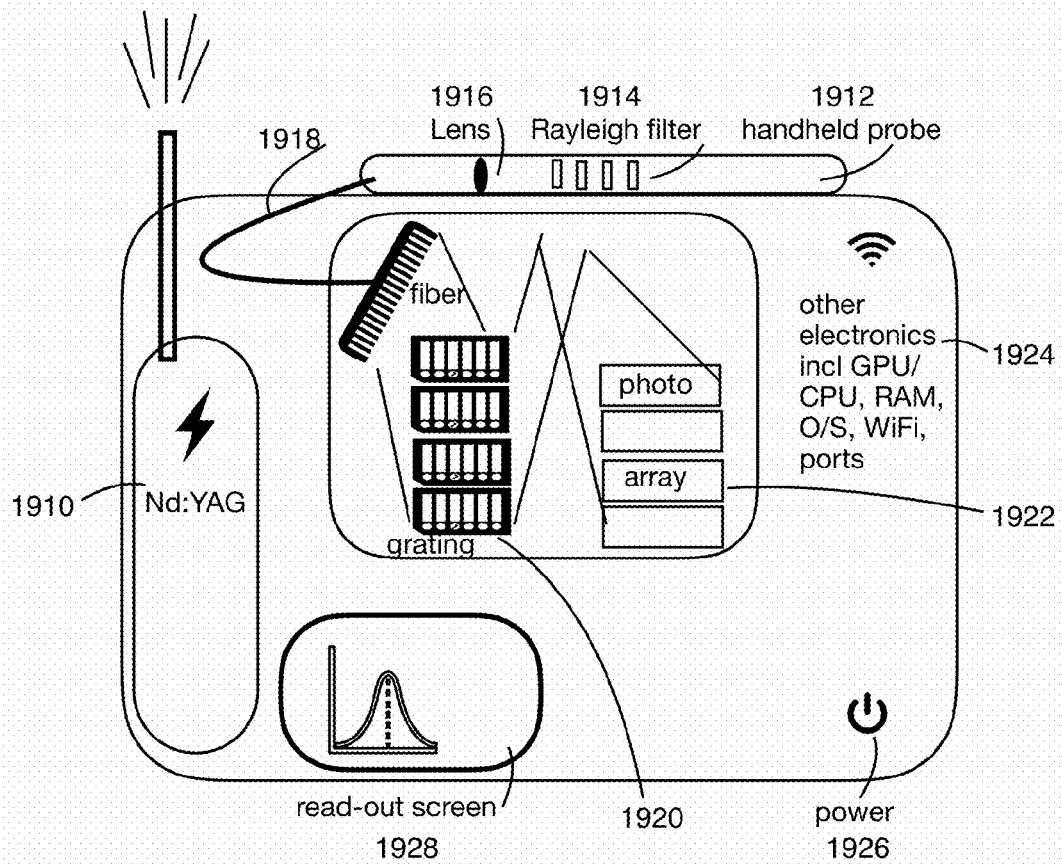
FIG. 19 is an illustration of a portable unit and shows how a portable unit contains a multi-wavelength laser source, a read-out screen, a handheld wand or probe containing the collection optics of the lens and Rayleigh filter, the spectrograph with fiber bundle, hybrid diffraction grating and dedicated photodetector array, along with accessory electronics for proper functioning.

FIG. 19 shows a portable unit containing a multi-wavelength laser source 1910, a read-out screen 1928, a handheld wand or probe 1912 containing the collection optics of the lens 1916 and Rayleigh filter 1914, the spectrograph with fiber bundle 1918, hybrid diffraction grating 1920 and dedicated photodetector array 1922, along with accessory electronics for proper functioning 1924, and power source 1926.

Figure 20:
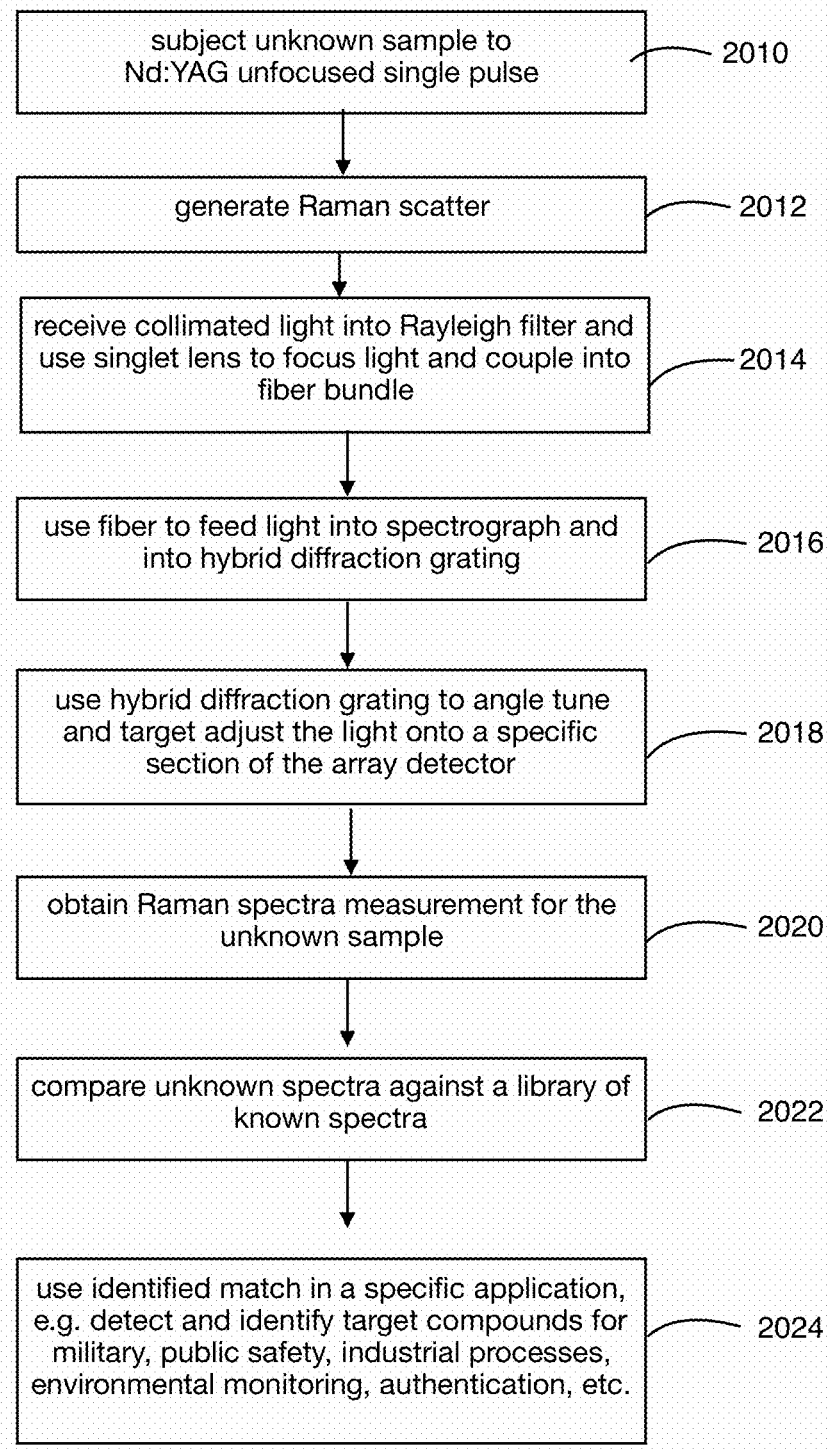
FIG. 20 shows an illustration of a multi-step process, including (i) subjecting an unknown sample to a laser unfocused single pulse, (ii) generating Raman scatter, (iii) receiving collimated light into the Rayleigh filter and using the singlet lens to focus the light and couple it to the fiber bundle, (iv) using the fiber to feed the light into the spectrograph and into the hybrid diffraction grating, (v) using the hybrid diffraction grating to angle tune and target adjust the light on a specific section of the array detector. Further steps may also include (vi) obtaining Raman spectra measurements for the unknown sample, (vii) comparing the unknown spectra against a library of known (sample) spectra, and (viii) using the identified compound or match in a specific application, such as detecting and identifying target compounds for military, public safety, industrial processes, environmental monitoring, and authentication.

FIG. 20 shows an illustration of a multi-step process, including (i) subjecting an unknown sample to a laser unfocused single pulse 2010, (ii) generating Raman scatter 2012, (iii) receiving collimated light into the Rayleigh filter and using the singlet lens to focus the light and couple it to the fiber bundle 2014, (iv) using the fiber to feed the light into the spectrograph and into the hybrid diffraction grating 2016, (v) using the hybrid diffraction grating to angle tune and target adjust the light on a specific section of the array detector 2018, (vi) obtaining Raman spectra measurements for the unknown sample 2020, (vii) comparing the unknown spectra against a library of known (sample) spectra 2022, and (viii) using the identified compound or match in a specific application 2024, such as detecting and identifying target compounds for military, public safety, industrial processes, environmental monitoring, authentication, and so forth.

Additional Examples

Explosives

Figure 21:
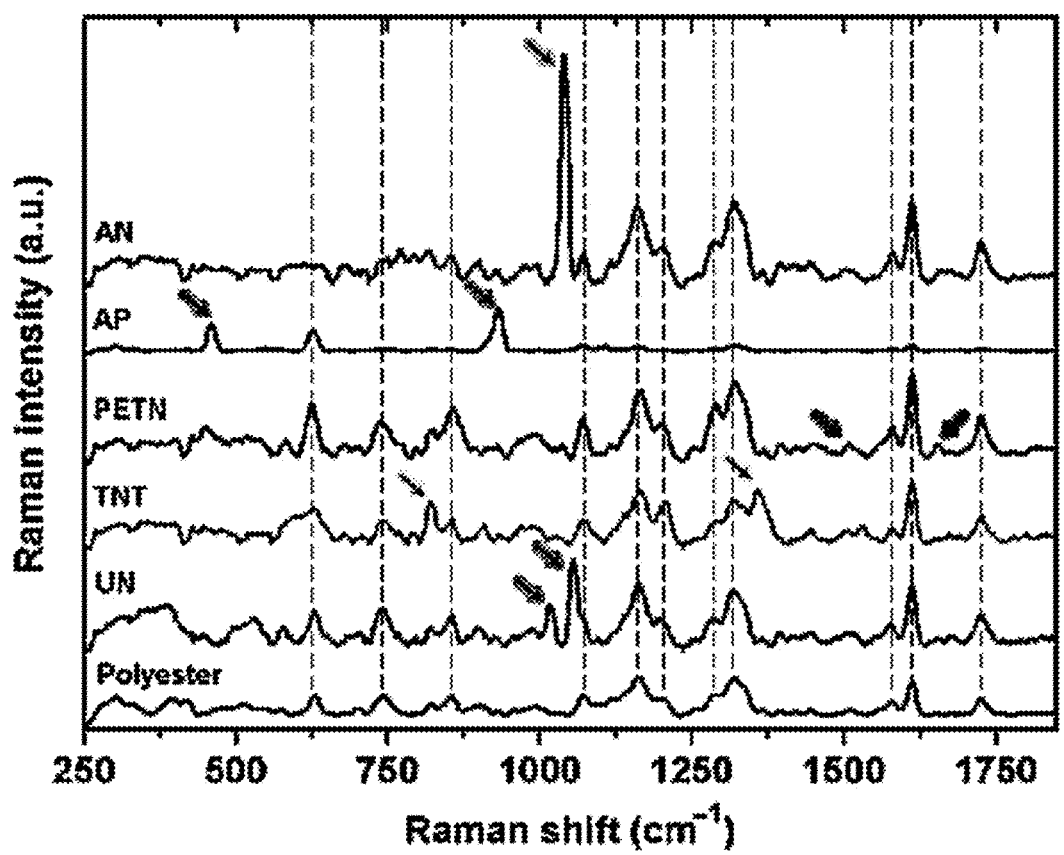
FIG. 21 is a line graph and shows a non-limiting example of Raman spectral measurement that may be performed for various types of explosives (ammonium nitrate-AN, triacetone triperoxide-AP, pentaerythritol tetranitrate-PETN, trinitrotoluene-TNT, urea nitrate-UN) on a polyester background for detection.

In this example, FIG. 21 illustrates how the user is attempting to identify an explosive. The apparatus of the present invention is used to perform a Raman spectral measurement of a sample, which is compared against Raman spectral measurement for various types of explosives (ammonium nitrate-AN, triacetone triperoxide-AP, pentaerythritol tetranitrate-PETN, trinitrotoluene-TNT, urea nitrate-UN) on a polyester background for detection.

Diamonds

Figure 22:
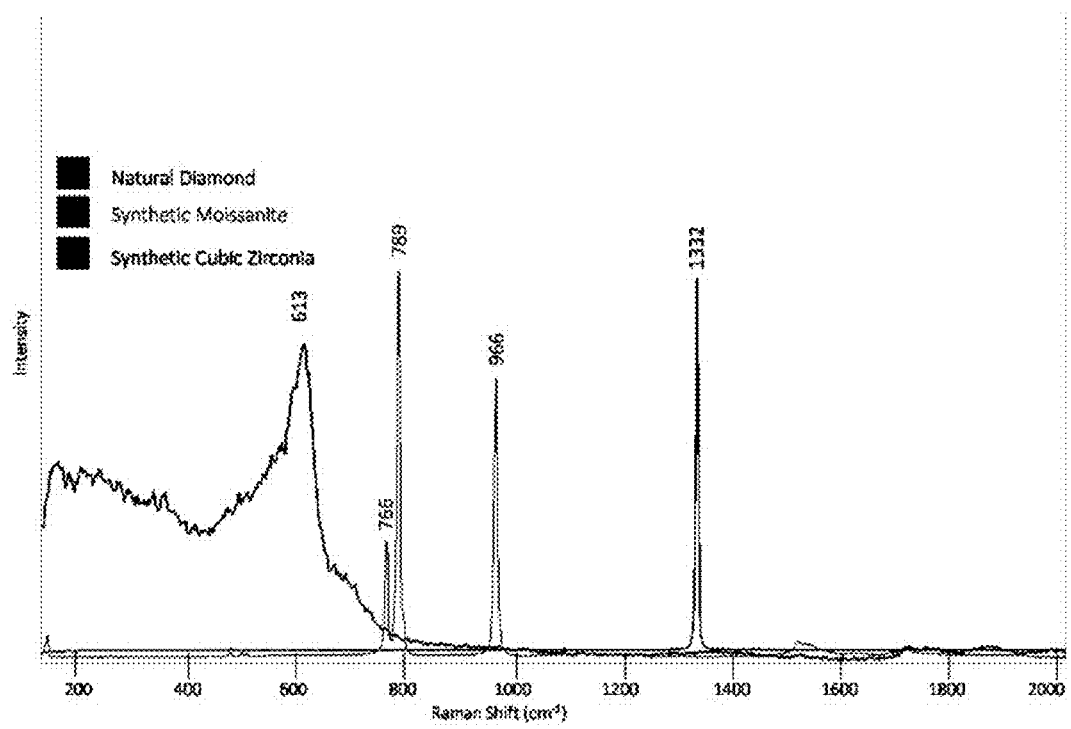
FIG. 22 is a line graph and shows a non-limiting example of Raman spectral measurement that may be performed for comparison of natural diamond, synthetic moissanite, and synthetic cubic zirconia.

In this example, FIG. 22 illustrates how the user is attempting to identify an explosive. The apparatus of the present invention is used to perform a Raman spectral measurement of a sample, which is compared against Raman spectral measurement for natural diamond, synthetic moissanite, and synthetic cubic zirconia.

Chemical Identification

Figure 23:
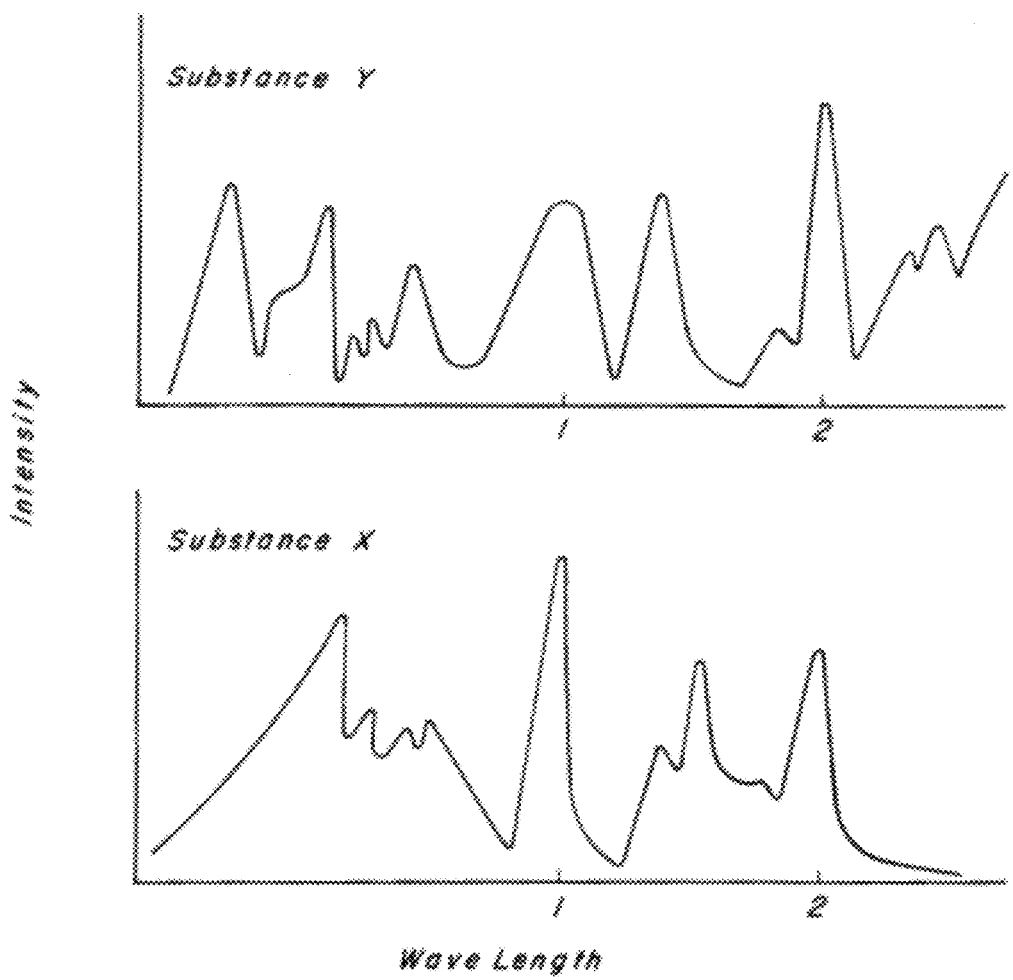
FIG. 23 is a line graph and shows a non-limiting example of Raman spectral measurement that may be performed for general identification of chemical species in, e.g. an industrial setting.

In this example, FIG. 23 illustrates how the user is attempting to identify an chemical species. The apparatus of the present invention is used to perform a Raman spectral measurement of a sample, which is compared against Raman spectral measurement for general identification of chemical species in, e.g. an industrial setting.

Drilling Fluids

Figure 24:
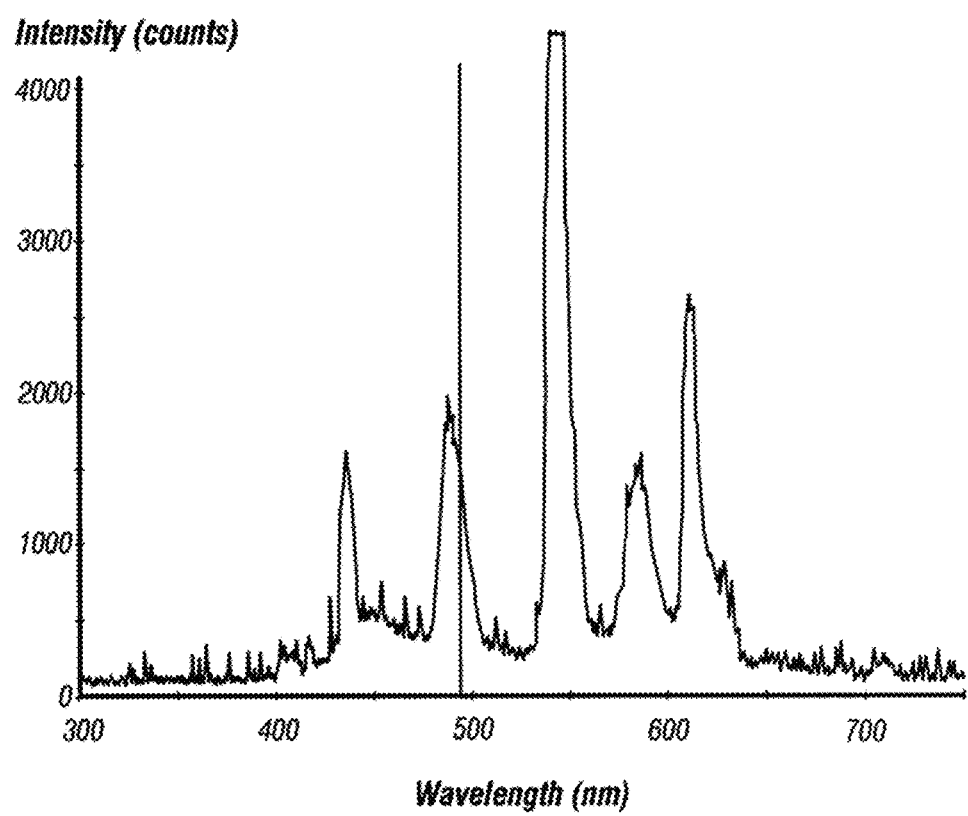
FIG. 24 is a line graph and shows a non-limiting example of Raman spectral measurement that may be performed for drilling fluids.

In this example, FIG. 24 illustrates how the user is attempting to identify drilling fluids. The apparatus of the present invention is used to perform a Raman spectral measurement of a sample, which is compared against Raman spectral measurement for for drilling fluids.

Industrial or Commercial Oils

Figure 25:
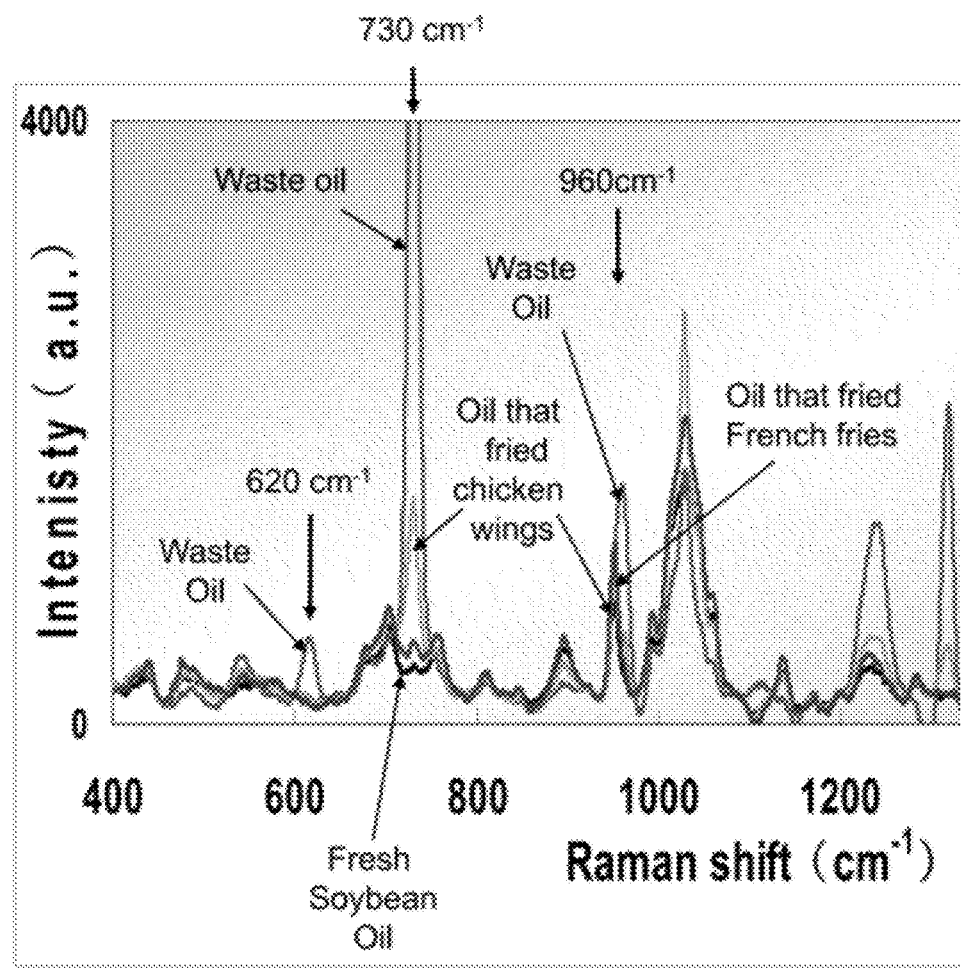
FIG. 25 is a line graph and shows a non-limiting example of Raman spectral measurement that may be performed for analyzing various oils.

In this example, FIG. 25 illustrates how the user is attempting to identify commercial oils. The apparatus of the present invention is used to perform a Raman spectral measurement of a sample, which is compared against Raman spectral measurement for for analyzing various oils.

Industrial Process Stream, Pharma

Figure 26:
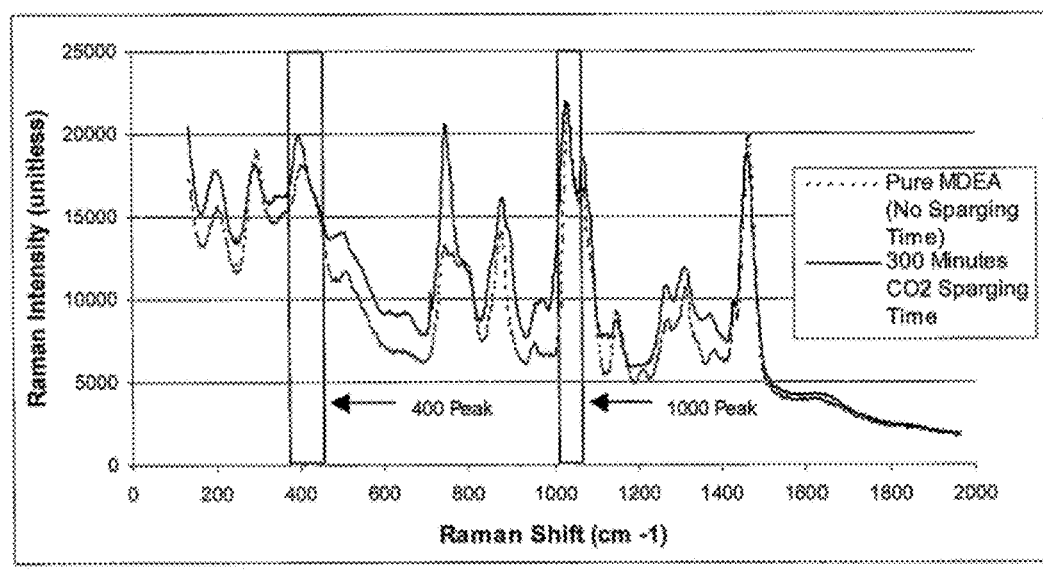
FIG. 26 is a line graph and shows a non-limiting example of Raman spectral measurement that may be performed for an industrial process stream.

In this example, FIG. 26 illustrates how the user is attempting to identify a pharmaceutical compound. The apparatus of the present invention is used to perform a Raman spectral measurement of a sample, which is compared against Raman spectral measurement for for an industrial process stream.

Fuels

Figure 27:
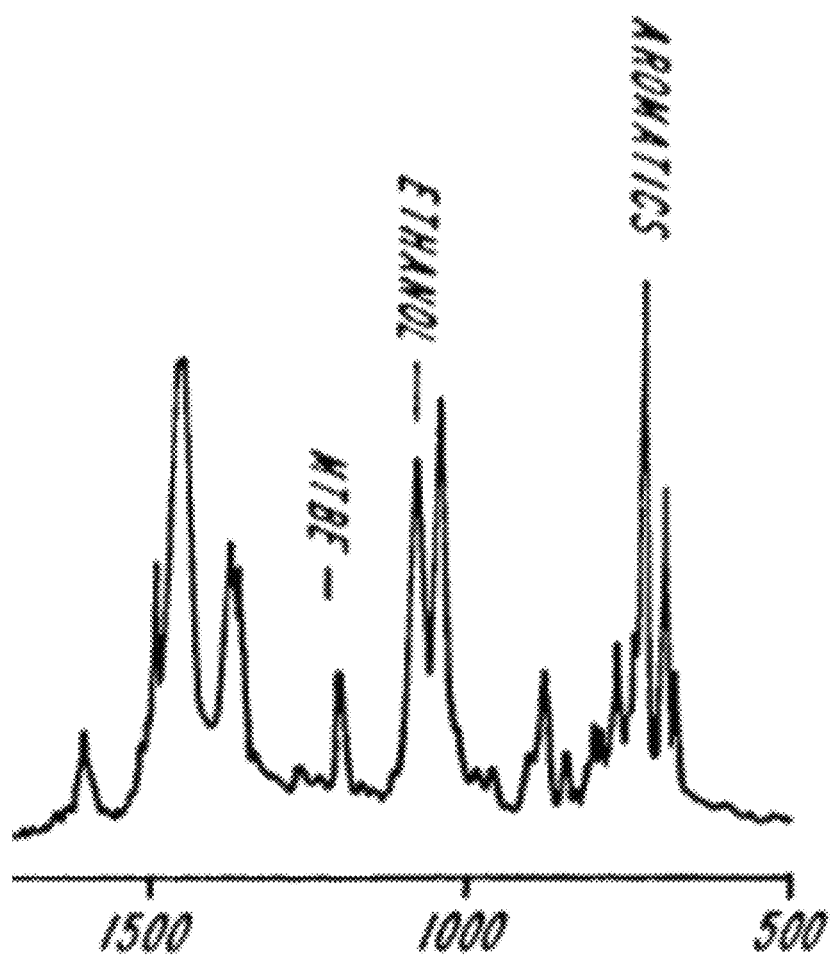
FIG. 27 is a line graph and shows a non-limiting example of Raman spectral measurement that may be performed for analyzing additives and contents of fuel.

In this example, FIG. 27 illustrates how the user is attempting to identify components or impurities in fuel. The apparatus of the present invention is used to perform a Raman spectral measurement of a sample, which is compared against Raman spectral measurement for analyzing additives and contents of fuel.

Semiconductor Manufacturing

Figure 28:
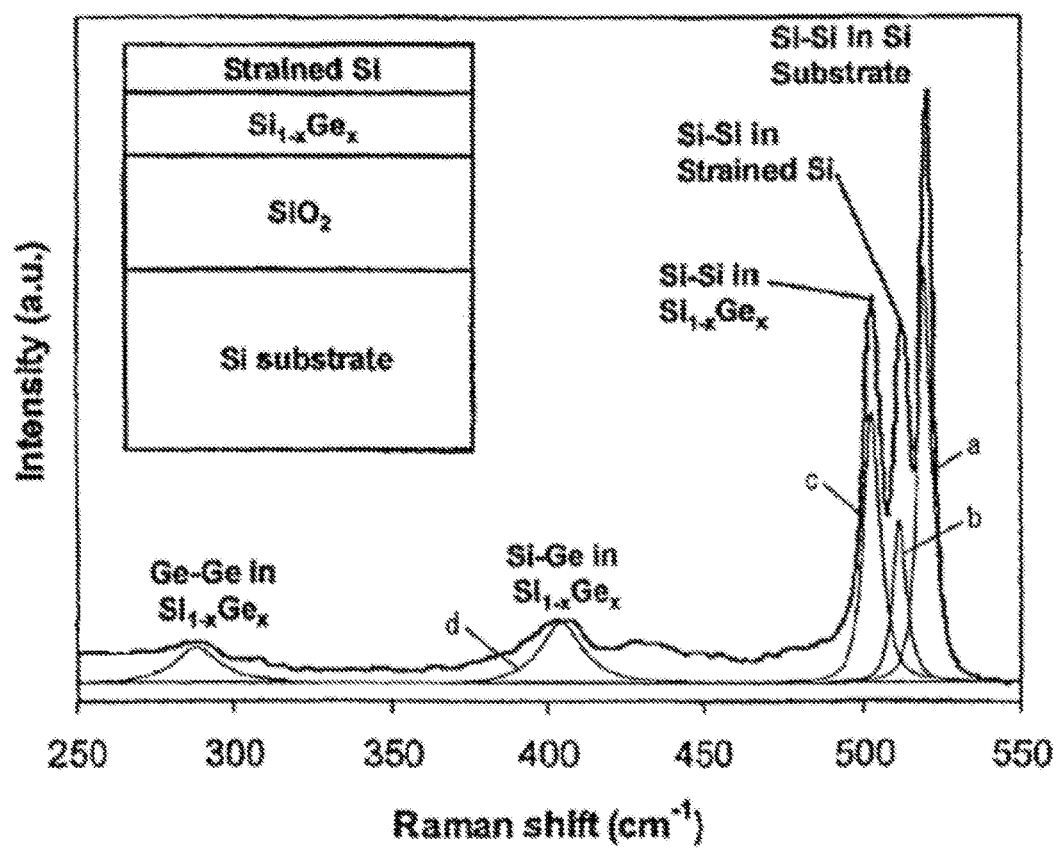
FIG. 28 is a line graph and shows a non-limiting example of Raman spectral measurement that may be performed for analyzing silicon and other substrates in semiconductor manufacturing.

In this example, FIG. 28 illustrates how the user is attempting to identify materials used in semiconductor manufacturing. The apparatus of the present invention is used to perform a Raman spectral measurement of a sample, which is compared against Raman spectral measurement for for analyzing silicon and other substrates in semiconductor manufacturing.

Authentication/Tracking with Nanoparticles

Figure 29:
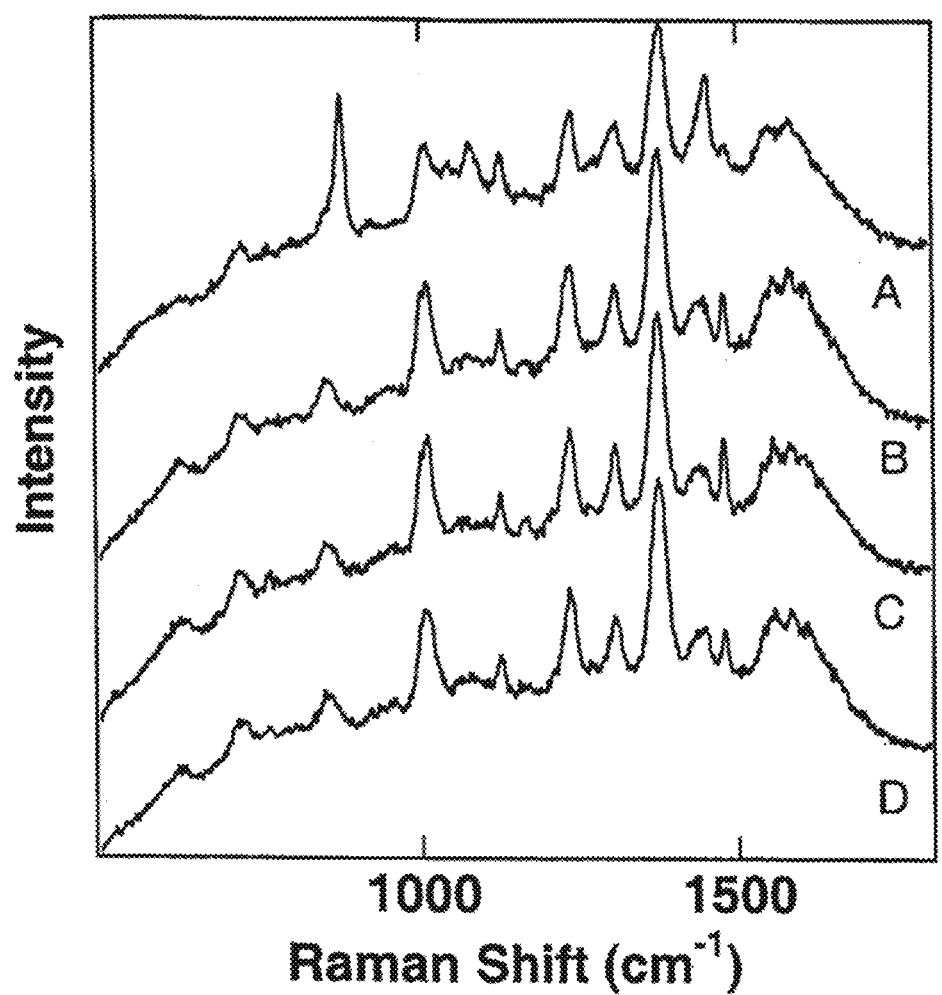
FIG. 29 is a line graph and shows a non-limiting example of Raman spectral measurement that may be performed for nanoparticles that can be used for authentication and/or tracking.

In this example, FIG. 29 illustrates how the user is attempting to identify a fake or gray-market item. The apparatus of the present invention is used to perform a Raman spectral measurement of a sample, which is compared against Raman spectral measurement for for nanoparticles that can be used for authentication and/or tracking.

Antibodies

Figure 30:
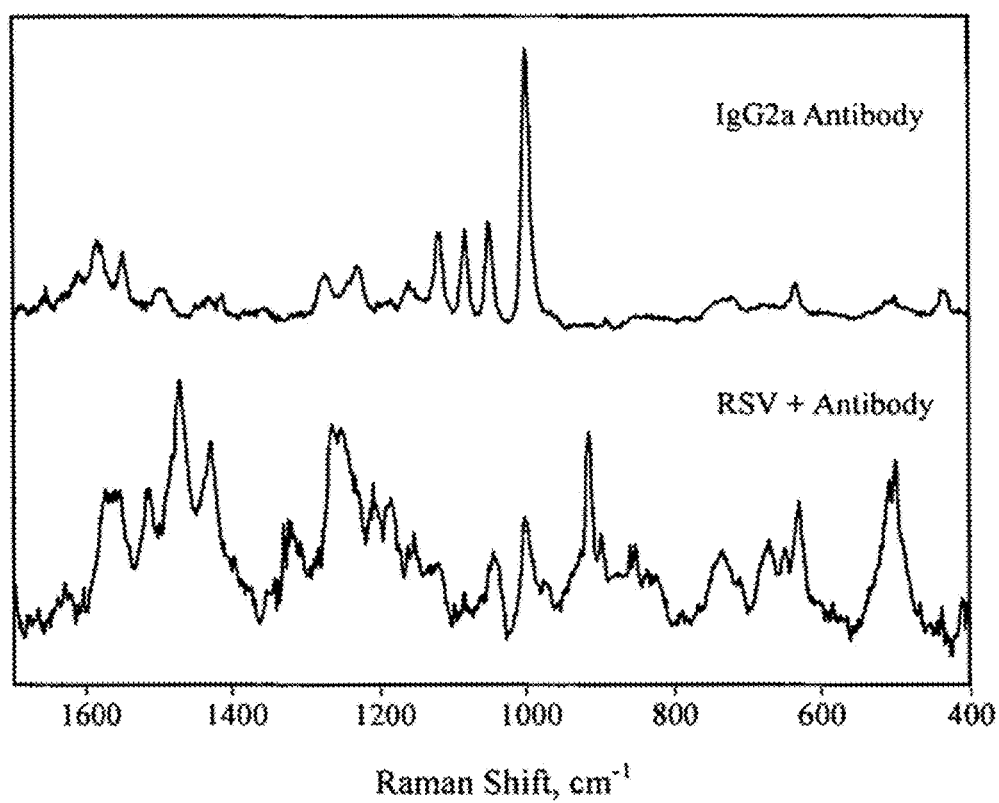
FIG. 30 is a line graph and shows a non-limiting example of Raman spectral measurement that may be performed for detection and analysis of antibodies and conjugated antibody pairs.

In this example, FIG. 30 illustrates how the user is attempting to identify an antibody. The apparatus of the present invention is used to perform a Raman spectral measurement of a sample, which is compared against Raman spectral measurement for for detection and analysis of antibodies and conjugated antibody pairs.

Fiber Analysis

Figure 31:
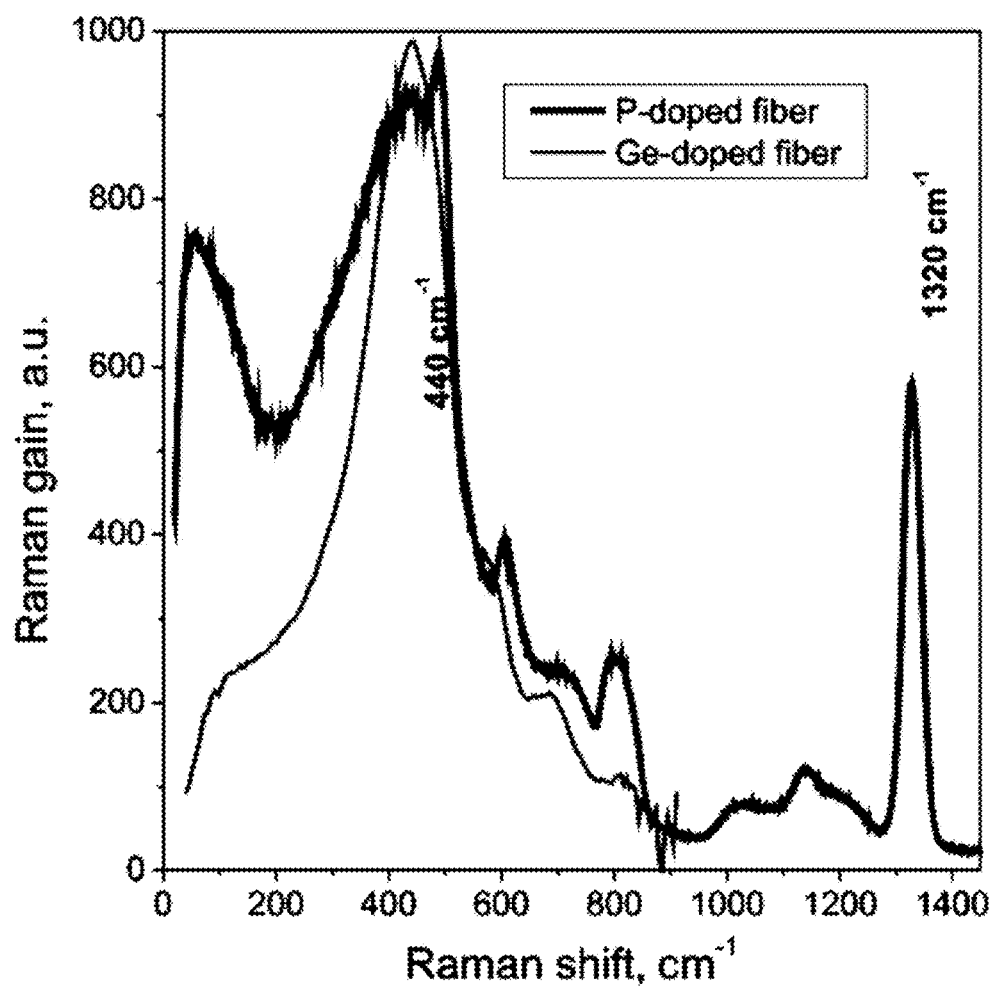
FIG. 31 is a line graph and shows a non-limiting example of Raman spectral measurement that may be performed for analysis of fibers.

In this example, FIG. 31 illustrates how the user is attempting to identify a collection of fibers, in this case, silica doped fiber. The apparatus of the present invention is used to perform a Raman spectral measurement of a sample, which is compared against Raman spectral measurement for analysis of fibers.

Toxins

Figure 32:
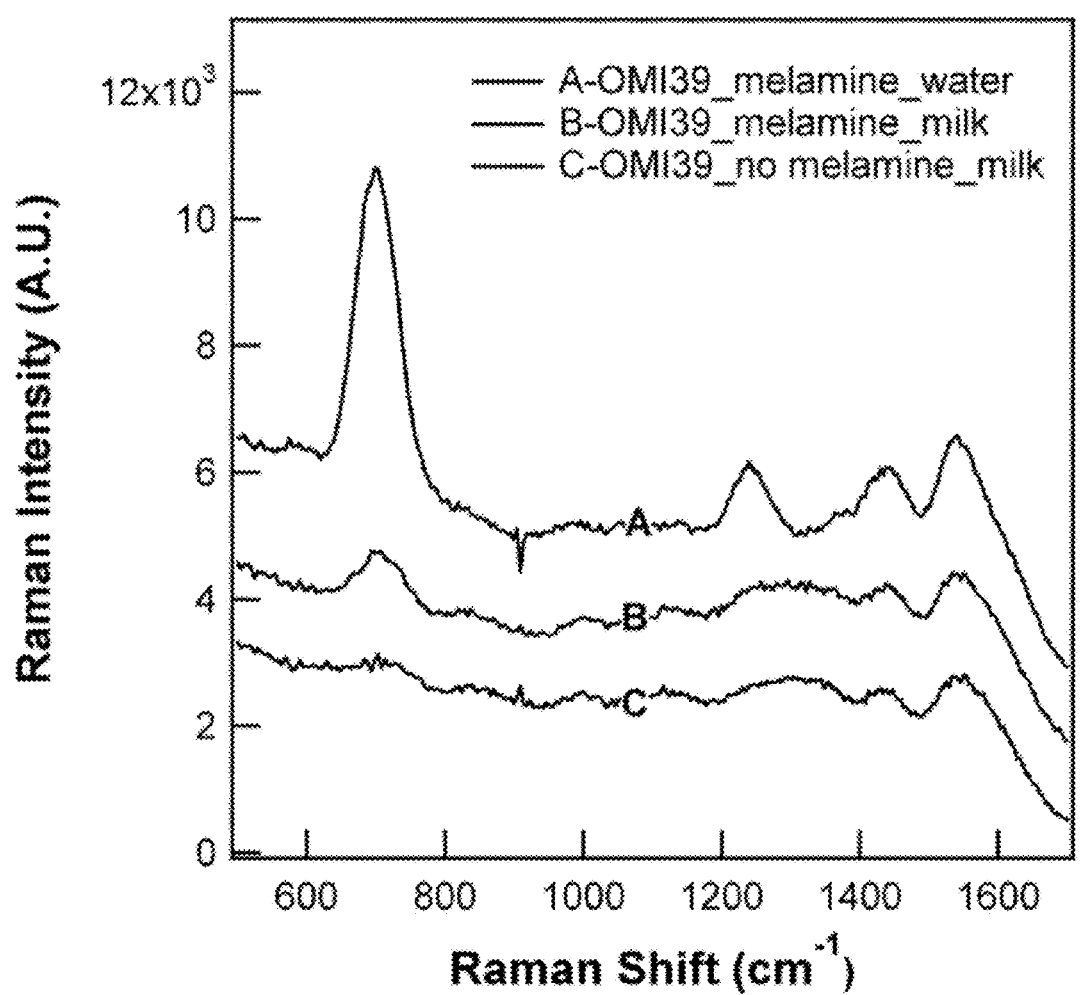
FIG. 32 is a line graph and shows a non-limiting example of Raman spectral measurement that may be performed for detection and analysis of a toxin, e.g. melamine in milk.

In this example, FIG. 32 illustrates how the user is attempting to identify a toxin. The apparatus of the present invention is used to perform a Raman spectral measurement of a sample, which is compared against Raman spectral measurement for for detection and analysis of a toxin, e.g. melamine in milk.

Biochemistry

Figure 33:
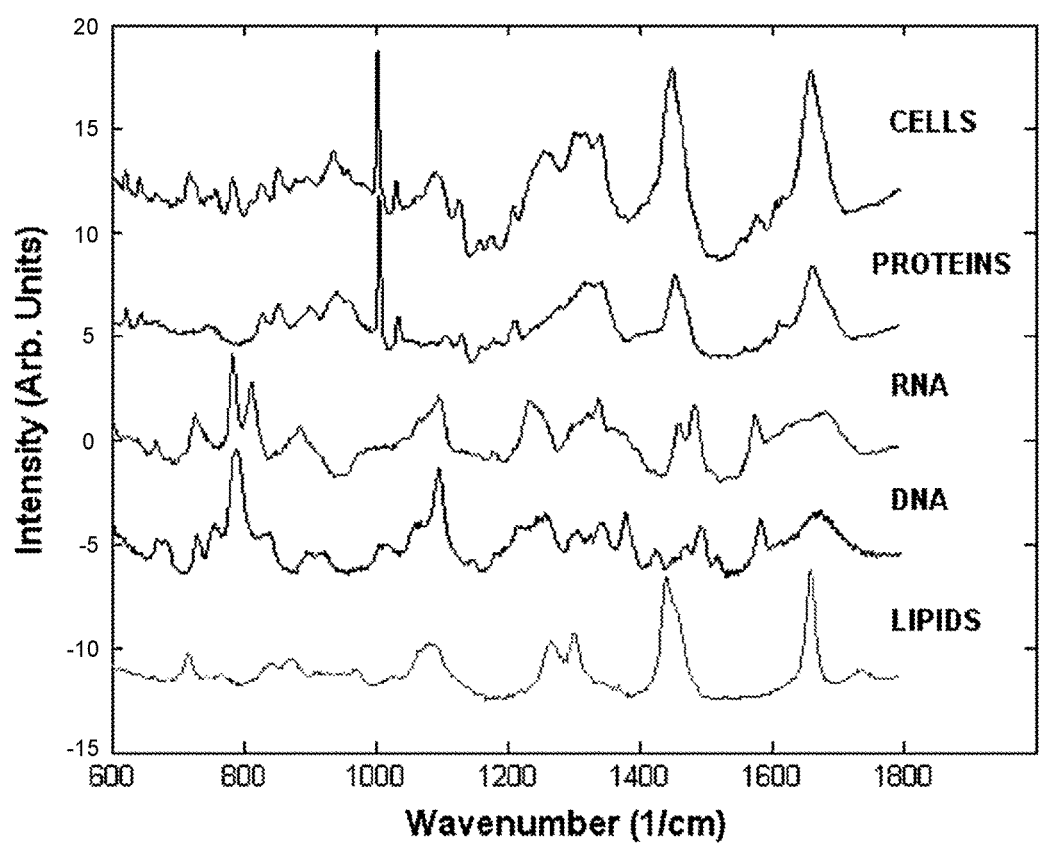
FIG. 33 is a line graph and shows a non-limiting example of Raman spectral measurement that may be performed for detection and analysis of various types of biochemical items, e.g. cells, proteins, nucleic acids, and lipids.

In this example, FIG. 33 illustrates how the user is attempting to identify various items commonly detected in biochemistry setting. The apparatus of the present invention is used to perform a Raman spectral measurement of a sample, which is compared against Raman spectral measurement for for detection and analysis of various types of biochemical items, e.g. cells, proteins, nucleic acids, and lipids.

Forensic Body Fluids

Figure 34:
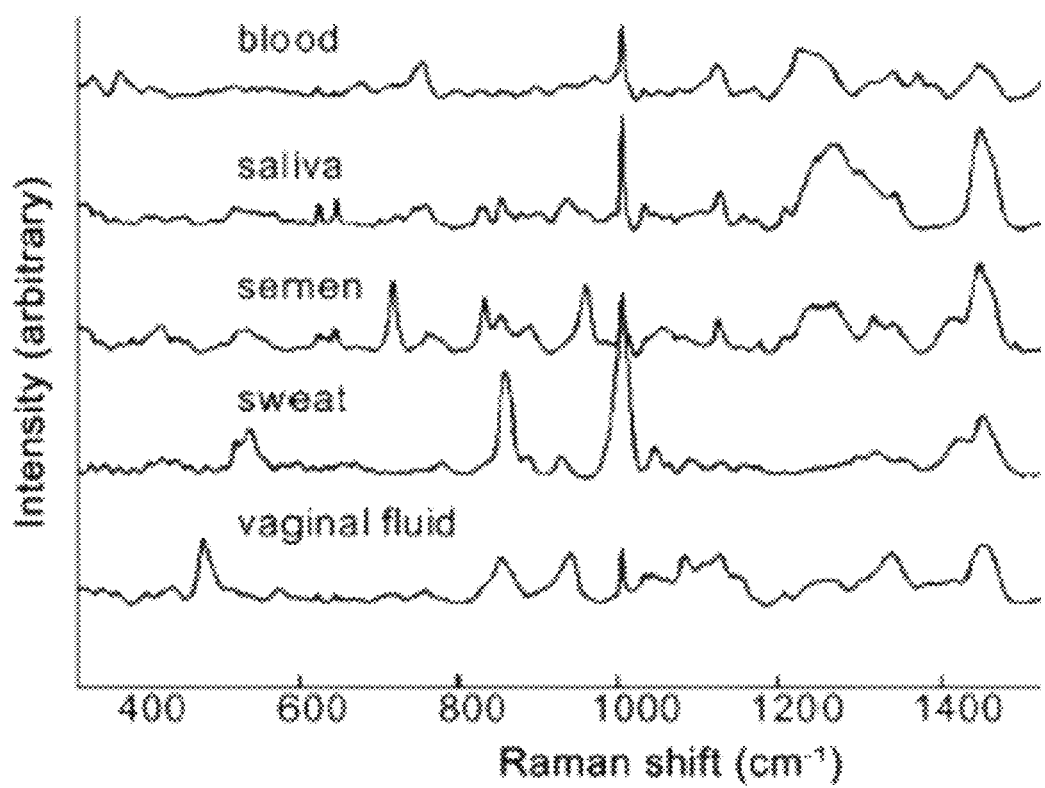
FIG. 34 is a line graph and shows a non-limiting example of Raman spectral measurement that may be performed for forensic detection and comparison of or for scientific research on body fluids including blood, saliva, semen, sweat, and vaginal fluid.

In this example, FIG. 34 illustrates how the user is attempting to identify fluid in a forensic analysis. The apparatus of the present invention is used to perform a Raman spectral measurement of a sample, which is compared against Raman spectral measurement for for forensic detection and comparison of or for scientific research on body fluids including blood, saliva, semen, sweat, and vaginal fluid.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

The invention claimed is:

1. An apparatus for Raman spectra measurement, comprising:

a Nd YAG laser configured to simultaneously output a single pulse of an unfocused beam of photons in two or more excitation wavelengths selected from 213 nm, 266 nm, 532 nm and 1064 nm onto an sample, said laser output ranging from 1-100 mJ per pulse at 10 Hz;

a dichroic Rayleigh filter stack in optical communication with scattered light from the single pulse of unfocused beam of photons incident on the sample;

a singlet lens in optical communication with the dichroic Rayleigh filter stack to focus the scattered light from the sample and couple the scattered light into a proximal end of a stacked fiberoptic bundle;

a spectrograph equipped with a hybrid diffraction grating attached to a distal end of the stacked fiberoptic bundle, said hybrid diffraction grating comprised of a stack of at least two diffraction surfaces, each diffraction surface configured for blaze density and wavelength for one of the two or more excitation wavelengths, each diffraction surface individually angle-tuned and target-adjusted to disperse the scattered light, wherein the spectrograph is configured to to illuminate all of the at least two diffraction surfaces simultaneously;

an array detector system in optical communication with the spectrograph and configured to receive the dispersed scattered light from each diffraction surface onto a specific target section of an array detector, and output a spectral intensity measurement.

2. The apparatus of claim 1, wherein the hybrid diffraction grating is a surface relief reflection grating wherein depth of a surface relief pattern on the grating modulates the phase of the scattered light.

3. The apparatus of claim 1, wherein the hybrid diffraction grating is a volume phase grating wherein the scattered light phase is modulated as it passes through a volume of a periodic phase structure.

4. The apparatus of claim 1, wherein the hybrid diffraction grating comprised of a stack of four diffraction surfaces.

5. The apparatus of claim 1, wherein the hybrid diffraction grating comprised of a stack of eight diffraction surfaces.

6. The apparatus of claim 1, wherein the laser output is 3-9 mJ per pulse at 10 Hz.

7. The apparatus of claim 1, wherein the array detector is selected from a charge-coupled device (CCD), an intensified charge-coupled device (ICCD), an InGaAs photodetector, and a CMOS photodetector.

8. The apparatus of claim 1, wherein the array detector system comprises two or more arrays selected from the group consisting of a CCD, an ICCD, an InGaAs photodetector, and a CMOS photodetector.

9. The apparatus of claim 1, wherein the apparatus is mounted on a vehicle, an unmanned vehicle, a piloted aircraft, a drone aircraft, or a satellite.

10. The apparatus of claim 1, wherein the dichroic Rayleigh filter stack and the singlet lens are mounted within a remote probe housing.

11. The apparatus of claim 1, wherein the laser, the dichroic Rayleigh filter stack, the singlet lens, the spectrograph, and the array detector system are mounted within a single housing.

12. The apparatus of claim 11, wherein the housing is 8-16 cm in height, 50-90 cm in length, and 30-90 cm in width.

13. A method for comparing the Raman spectral intensity measurement of an unknown sample against a library of spectral intensity measurements, comprising the steps:

providing an apparatus according to claim 1;

subjecting the unknown sample to a single unfocused pulse from the Nd YAG laser, wherein said sample has a standoff distance from the laser ranging from 0.30 meters to 20,000 meters;

obtaining a Raman spectral intensity measurement of the unknown sample; and comparing the Raman spectral intensity measurement of the sample against a library of spectral intensity measurements of known samples.

14. The method of claim 13, wherein the standoff distance from the laser ranges from 0.30 meters to 200 meters.

15. The method of claim 13, wherein the sample is selected from the group consisting of a particle, a powder, a flake, a solid, a liquid, a gas, a plasma, a gel, a foam, and combinations thereof.

16. The method of claim 13, further comprising the step of identifying a match for the spectral intensity measurement of the unknown sample from the spectral intensity measurement of the known samples.

17. The method of claim 16, further comprising the step wherein the identified match is used in a system selected from the group consisting of: real-time detection of a roadbed explosive; assessment of diamond quality; real-time identification of chemical species within a plasma reactor environment; real-time identification of drilling fluids; real-time identification of hydrocarbon oil mixtures; real-time identification of constituents of a process stream at an inlet of a reaction vessel; real-time characterization of fuel at a fuel dispenser; real-time monitoring of reacting chemicals in semi-conductor manufacturing; real-time monitoring of reacting chemicals in pharmaceutical manufacturing; identification of a horticultural chemical; identification of a biochemical compound; identification of a polymer; authentication of a product; identification of a pathogen; identification of a toxin; real-time detection of a target compound on baggage in an airport; real-time detection of a target compound on shipping containers and boxes; real-time detection of a target compound in a water treatment facility; real-time detection of a target compound in smokestack emissions; real-time detection of a target compound in waste water; real-time detection of a target compound in a hazardous spill; real-time detection of a target compound on a law enforcement forensic sample.

* * * * *